United States Patent
Nishimura

(10) Patent No.: US 7,753,785 B2
(45) Date of Patent: Jul. 13, 2010

(54) GAME APPARATUS, STORING MEDIUM THAT STORES CONTROL PROGRAM OF VIRTUAL CAMERA, AND CONTROL METHOD OF VIRTUAL CAMERA

(75) Inventor: Katsuhito Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 867 days.

(21) Appl. No.: 10/803,881

(22) Filed: Mar. 19, 2004

(65) Prior Publication Data

US 2004/0224761 A1 Nov. 11, 2004

(30) Foreign Application Priority Data

May 6, 2003 (JP) ............... 2003-127759

(51) Int. Cl.
*A63F 9/00* (2006.01)
*G06T 17/00* (2006.01)

(52) U.S. Cl. .................. 463/32; 463/31; 463/33; 463/34; 345/418; 345/419; 345/619; 345/473; 345/474

(58) Field of Classification Search .......... 463/31–34, 463/43; 345/419–427, 473, 474, 437, 649–653
See application file for complete search history.

(56) References Cited

U.S. PATENT DOCUMENTS

| | | | |
|---|---|---|---|
| 6,283,857 B1 * | 9/2001 | Miyamoto et al. ........... 463/31 |
| 6,409,597 B1 * | 6/2002 | Mizumoto .................. 463/31 |
| 6,670,957 B2 * | 12/2003 | Fukuda ...................... 345/473 |
| 6,926,608 B2 * | 8/2005 | Tashiro et al. ............... 463/31 |
| 2002/0128063 A1 * | 9/2002 | Kunieda et al. ............. 463/31 |
| 2003/0038428 A1 * | 2/2003 | Yotoriyama ............... 273/440.1 |
| 2003/0166413 A1 * | 9/2003 | Hayashida et al. .......... 463/30 |
| 2004/0209688 A1 * | 10/2004 | Mizuki et al. ............... 463/36 |
| 2004/0219980 A1 * | 11/2004 | Bassett et al. ............... 463/33 |
| 2004/0219981 A1 * | 11/2004 | Bando ....................... 463/35 |
| 2005/0020363 A1 * | 1/2005 | Kawamoto et al. .......... 463/32 |

FOREIGN PATENT DOCUMENTS

| JP | 10-113468 | 5/1998 |
|---|---|---|
| JP | 11-347249 | 12/1999 |
| JP | 2000-084244 | 3/2000 |
| JP | 2003-058915 | 2/2003 |
| JP | 2004329463 A * | 11/2004 |
| JP | 2005245795 A * | 9/2005 |

OTHER PUBLICATIONS

Office Action dated Jul. 24, 2007 issued in Japanese Patent Application No. 2003-127759.

* cited by examiner

*Primary Examiner*—John M Hotaling
*Assistant Examiner*—Kang Hu
(74) *Attorney, Agent, or Firm*—Nixon & Vanderhye P.C.

(57) ABSTRACT

A game apparatus includes a CPU. The CPU generates a game image based on an image photographed by a virtual camera arranged in a game space, and displays the game image on a monitor connected to the game apparatus. A character location of a player character is used as a target location, for example, and the virtual camera is moved in such a manner that a location of a point-of-regard (point-of-regard location) of the virtual camera is brought close to this target location at a predetermined ratio. That is, the virtual camera follows the player character from behind after some delay.

27 Claims, 12 Drawing Sheets (A) n-th FRAME (B) (n+1)-th FRAME (C) (n+2)-th FRAME

GAME APPARATUS, STORING MEDIUM THAT STORES CONTROL PROGRAM OF VIRTUAL CAMERA, AND CONTROL METHOD OF VIRTUAL CAMERA

BACKGROUND

1. Technical Field of Present Exemplary Embodiments

Present exemplary embodiments relate to a game apparatus, a storing medium that stores a control program of a virtual camera, and a control method of a virtual camera. More specifically, the present exemplary embodiments relates to a game apparatus, a storing medium that stores a control program of a virtual camera, and a control method of a virtual camera, in which the virtual camera arranged in a three-dimensional game space is made to follow a movement of a player character in a game space so that a behavior of the player character in the game space is displayed in a displaying means as a game image.

2. Description of the Prior Art

One example of such a kind of a conventional game apparatus is disclosed in Japanese Patent Laying-open No. 11-347249 laid-open on Dec. 11, 1999. An image generating apparatus of this prior art is an apparatus that allows to follow a viewpoint of a virtual camera to a moving body operated by the player by a virtual spring provided between the moving body and the viewpoint. Therein, two spring constants different in size are prepared, and by rendering the spring constants large so as to strengthen a following intensity of the viewpoint, for example, so that a blurring of an image occurred in a case that the moving body accelerates or decelerates is minimized, thus providing an optimum game image for a game beginner. On the other hand, by rendering the spring constant small so as to weaken the following intensity of the viewpoint, the blurring of an image in a case that the moving body accelerates or decelerates is rendered large, thus increasing a difficulty of a game play. That is, there is provided an impressive and real game image to an advanced game player.

In addition, another example of such a kind of a conventional game apparatus is disclosed in Japanese Patent Laying-open No. 10-113468 laid-open on May, 6, 1998. A three-dimensional game apparatus of this prior art is an apparatus that allows the virtual camera to follow the moving body operated by the player by taking advantage of inertia. In a case that the moving body moves at high speed, for example, the virtual camera follows the moving body in such a manner as to be left behind, and in a case that the moving body moves at low speed, the virtual camera follows the moving body in a location close to immediately above the moving body.

However, in the former case, the location of the viewpoint (virtual camera) oscillates back and forth in conjunction with elasticity of the virtual spring so that it is difficult to play. In addition, this is a trigger that causes a so-called three-dimensional sick.

Furthermore, in the latter case, in a case that the moving body suddenly stops, the inertia unnecessarily brings the virtual camera close to the player character, and therefore, there is a problem that it is hard to look at the game screen to be displayed, thus difficult to play.

SUMMARY OF PRESENT EXEMPLARY EMBODIMENTS

Therefore, it is a primary aspect of the present exemplary embodiments to provide a novel game apparatus, storing medium that stores a virtual-camera control program, and control method of a virtual camera.

It is another aspect of the present exemplary embodiments to provide a game apparatus, a storing medium that stores a virtual-camera control program, and a control method of a virtual camera capable of displaying a game screen easy to play.

A game apparatus according to one present exemplary embodiment is a game apparatus in which a virtual camera arranged in a three-dimensional game space is made to follow a target location determined by a location of a player character in the game space so that a behavior of the player character in the game space is displayed in a displaying means as a game image. The game apparatus comprises: an input-information obtaining means for obtaining input information input through an operating means by a player at intervals of the predetermined number of frames in order to move the player character in the game space; a location updating means for updating the location of the player character and the target location in the game space based on the input information; a virtual-camera-location updating means for updating in order a location of the virtual camera in such a manner that a distance from the target location to a reference location determined in a predetermined manner toward the location of the virtual camera at a predetermined ratio is shortened irrespective of whether or not the player character has moved; and a game-image generating means for generating the game image based on the updated location of the player character and location of the virtual camera.

More specifically, in a game apparatus (12: reference numeral. Hereinafter, the same), a virtual camera (84) arranged in a three-dimensional game space (80) is made to follow a target location determined by a location of a player character (82) in the game space (80) so that a behavior of the player character (82) in the game space is displayed in a displaying means (34) as a game image. In this game apparatus (12), an input-information obtaining means (36, 56) obtains input information input through an operating means (22, 26) by a player at intervals of the predetermined number of frames in order to move the player character (82) in the game space (80). Herein, the interval of frames is a unit that represents a time period from one screen of an image is generated until the same is displayed. In a case that a frame rate is 60 fps, for example, a ⅟60-second unit is the interval of frames. That is, "obtaining at intervals of the predetermined number of frames" is that when the predetermined number is "1", it means to be obtained during a period of one frame (⅟60 seconds, for example). In addition, when the predetermined number is "2", it means to be obtained during a period of two frames (²⁄60 seconds, for example). A location updating means (36, S27) updates the location of the player character (82) and the target location in the game space (80) based on the input information. That is, each three-dimensional coordinate is updated. A virtual-camera-location updating means (36, S41, S43, S45, S61, S63, S65) updates in order a location of the virtual camera (84) in such a manner that a distance from the target location to a reference location determined in a predetermined manner toward the location of the virtual camera at a predetermined ratio is shortened irrespective of whether or not the player character has moved. That is, the virtual-camera-location updating means (36, S41, S43, S45, S61, S63, S65) repeatedly updates the location of the virtual camera (84) irrespective of a case that the player character (80) continues stopping or a case of continuing moving after being moved. Then, a game-image generating means (36, S15)

generates the game image based on the updated location of the player character (82) and location of the virtual camera (84).

According to one present exemplary embodiment, the location of the virtual camera is updated in order in such a manner that the reference location determined in a predetermined manner toward the virtual camera is always brought close to the target location at a predetermined ratio, thus enabling to move the virtual camera a little behind a movement of the player character, and in addition, not causing a blurring to the game screen. That is, it is possible to display the game screen that has a gentle expression and is easy to play.

In a certain aspect of the present exemplary embodiments, a game apparatus further comprises a virtual-camera setting means for arranging the virtual camera in a location determined in a predetermined manner toward a point of regard, and setting a direction of the virtual camera in such a manner as to face the point of regard. Herein, the reference location is a location of the point of regard, and the virtual-camera-location updating means updates in order the location of the virtual camera by updating in order the location of the point of regard in such a manner that a distance from the target location to the location of the point of regard is shortened at a predetermined ratio irrespective of whether or not the player character has moved. More specifically, the virtual-camera setting means (36, S45, S63) arranges the virtual camera (84) in a location determined in a predetermined manner toward the point of regard, and sets a direction of the virtual camera (84) in such a manner as to face the point of regard. In a case that the reference location is determined in a location of the point of regard, for example, the virtual camera-location updating means (36, S41, S43, S45, S61, S63, S65) updates in order the location of the virtual camera (84) by updating in order the location of the point of regard in such a manner that a distance from the target location to the location of the point of regard is shortened at a predetermined ratio irrespective of whether or not the player character (82) has moved. That is, the location of the point of regard has a predetermined distance relationship with the virtual camera (84), and the location of the virtual camera (84) is updated in a location having the predetermined distance relationship with updated location of the point of regard. Thereby, it enables the virtual camera (84) to follow from a little behind the player character (82), and allow the virtual camera (84) to approach thereto in a predetermined ratio even in a case that the player character (82) continues stopping after being moved.

In another aspect of present exemplary embodiments, a game apparatus further comprises a virtual-camera setting means for arranging the virtual camera in a location determined in a predetermined manner toward a point of regard, and setting a direction of the virtual camera in such a manner as to face the point of regard. Herein, the reference location is a location of the virtual camera, the target location is an initial location of the virtual camera that moves in conjunction with the player character, and the virtual-camera-location updating means updates in order the location of the virtual camera in such a manner that a distance from the target location to the location of the virtual camera is shortened at a predetermined ratio irrespective of whether or not the player character has moved. More specifically, the virtual-camera setting means (36, S45, S63) arranges the virtual camera (84) in a location determined in a predetermined manner toward a point of regard, and sets a direction of the virtual camera in such a manner as to face the point of regard. The reference location is a location of the virtual camera (84), and the target location is an initial location of the virtual camera that moves in conjunction with the player character, for example. The virtual-camera-location updating means (36, S41, S43, S45, S61, S63, S65) updates in order the location of the virtual camera (84) in such a manner that a distance from the target location to the location of the virtual camera (84) is shortened at a predetermined ratio irrespective of whether or not the player character (82) has moved. In doing this, too, it is possible to allow the virtual camera (84) to follow a little behind the player character (82), and in addition, bring the virtual camera (84) close thereto at a predetermined ratio even in a case that the player character (82) continues stopping after being moved.

In a still another aspect of present exemplary embodiments, a game apparatus further comprises a distance determining means for setting a maximum distance that uses the target location as a reference, and determining whether or not the distance from the target location to the reference location is rendered longer than the maximum distance; and a forcedly updating means for forcedly updating the reference location to a location within the maximum distance that uses the target location as a reference when determined by said distance determining means that the distance is rendered longer than the maximum distance. More specifically, the maximum distance that uses the target location as a reference is set, and the distance determining means (36, S39, S59) determines whether or not the distance from the target location to the reference location is rendered longer than the maximum distance. When determined by the distance determining means (36, S39, S59) that the distance is rendered longer than the maximum distance, the forcedly updating means (36, S43, S45, S61, S63) forcedly updates the reference location to a location within the maximum distance that uses the target location as a reference. The maximum distance is set in order that the player character (82) does not deviate from the game screen, for example, and therefore, in a case that the player character (82) moves at high speed, for example, the reference location is brought close at a predetermined ratio. In addition, in a case of exceeding the maximum distance, the reference location is forcedly moved within the maximum distance. Thereby, an unfavorable game screen is prevented from being displayed.

In a certain embodiment, the camera-location updating means includes a reference-location calculating means for calculating an updated reference location, and the distance determining means determines whether or not the updated reference location calculated by the reference-location calculating means is rendered longer than the maximum distance from the target location. More specifically, the camera-location updating means (36, S41, S43, S45, S61, S63, S65) includes a reference-location calculating means (36, S37, S57) for calculating the updated reference location. That is, the distance determining means (36, S39, S59) determines whether or not the updated reference location calculated by the reference-location calculating means (36, S37, S57) is rendered longer than the maximum distance from the target location. The updated location of the virtual camera (82) is appropriately set so that an unfavorable game screen is prevented from being displayed.

A storing medium that stores a control program of a virtual camera according to present exemplary embodiments, and the control program of the virtual camera is executed by a computer of a game apparatus in which the virtual camera arranged in a three-dimensional game space is made to follow a target location determined by a location of a player character in the game space so that a behavior of the player character in the game space is displayed in a displaying means as a game image. The control program of this virtual camera allows the computer to be functioned as following means of: an input-information obtaining means for obtaining input information input through an operating means by a player at intervals of the predetermined number of frames in order to move the player character in the game space; a location updating means for updating the location of the player character and the target location in the game space based on the input information; a virtual-camera-location updating means for updating in order a location of the virtual camera in such a manner that a distance from the target location to a reference location determined in a predetermined manner toward the location of the virtual camera at a predetermined ratio is shortened irrespective of whether or not the player character has moved; and a game-image generating means for generating the game image based on the updated location of the player character and location of the virtual camera.

In the storing medium that stores the control program of this virtual camera, too, similar to the above-described game apparatus, it is possible to display the game screen easy to play.

A method of a virtual camera according to present exemplary embodiments, and the control method of the virtual camera in a game apparatus in which the virtual camera arranged in a three-dimensional game space is made to follow a target location determined by a location of a player character in the game space so that a behavior of the player character in the game space is displayed in a displaying means as a game image. The control method of the virtual camera comprises following steps of: (a) obtaining input information input through an operating means by a player at intervals of the predetermined number of frames in order to move the player character in the game space, (b) updating the location of the player character and the target location in the game space based on the input information, (c) updating in order a location of the virtual camera in such a manner that a distance from the target location to a reference location determined in a predetermined manner toward the location of the virtual camera at a predetermined ratio is shortened irrespective of whether or not the player character has moved, and (d) generating the game image based on the updated location of the player character and location of the virtual camera.

In this control method of the virtual camera, too, similar to the above-described game apparatus, it is possible to display the game screen easy to play.

The above described aspects and other features, aspects and advantages of the present exemplary embodiments will become more apparent from the following detailed description of the present exemplary embodiments when taken in conjunction with the accompanying drawings.

DETAILED DESCRIPTION OF EXEMPLARY, NON-LIMITING EMBODIMENTS

Figure 1:
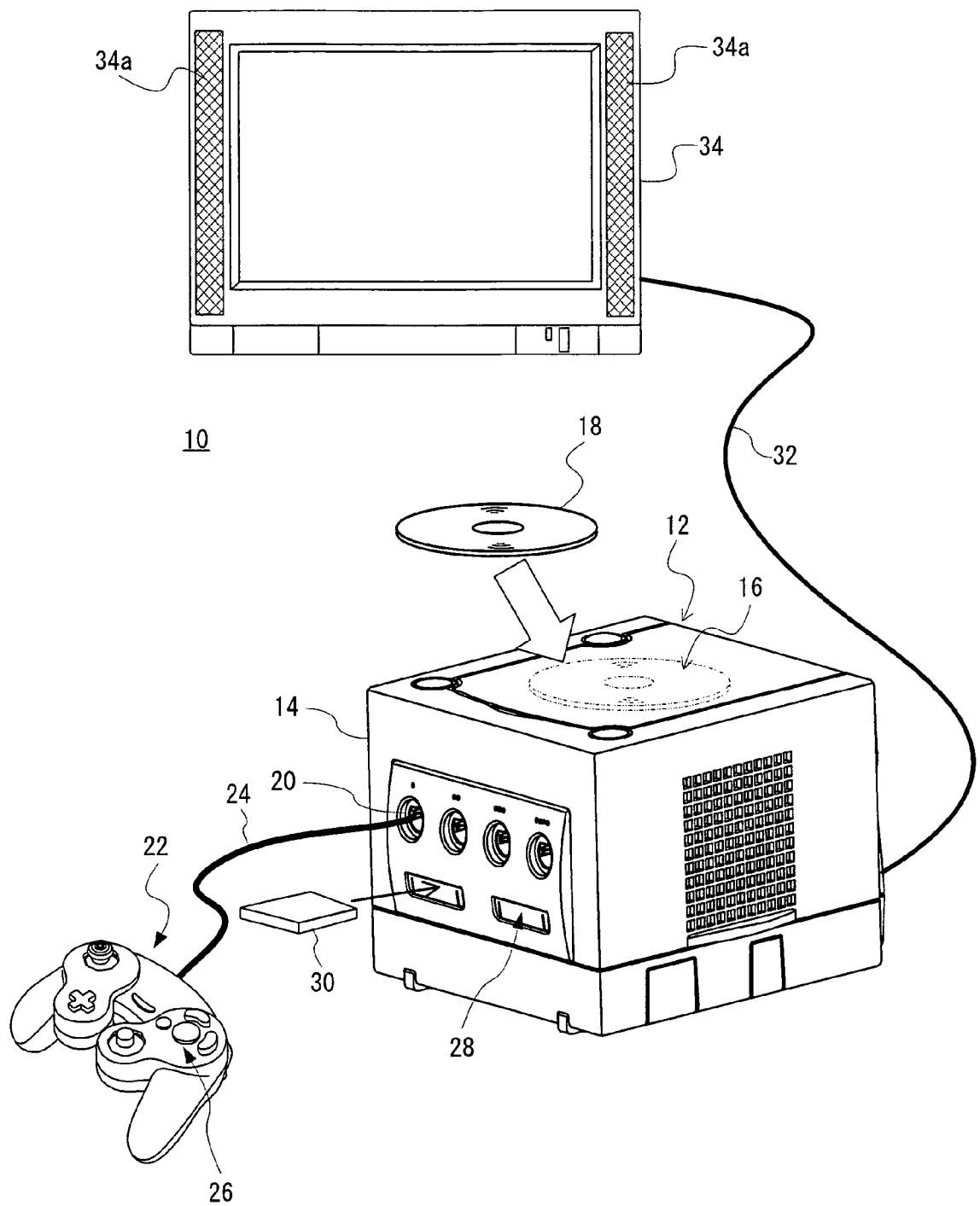
FIG. 1 is an illustrative view showing one example of a video game system of the present invention.

Referring to FIG. 1, a video game system 10 of this embodiment includes a video game apparatus 12. A power is supplied to this game apparatus 12, and this power may be an ordinary AC adaptor (not shown) in the embodiment. The AC adaptor is inserted into a home-use conventional wall outlet, and converts a home-use power into a low DC voltage signal appropriate for driving the video game apparatus 12. In another embodiment, a battery may be used as the power.

The video game apparatus 12 includes an approximately cubic housing 14, and at an upper end of the housing 14, an optical disk drive 16 is provided. In the optical disk drive 16, an optical disk 18, which is one example of an information storing medium that stores a game program, and etc., is attached. At a front surface of the housing 14, a plurality of (4 in this embodiment) connectors 20 are provided. These connectors 20 are connectors for connecting a controller 22 to the video game apparatus 12 by a cable 24 integrally provided with the controller 22, and in this embodiment, it is possible to connect a maximum of four controllers to the video game apparatus 12.

In the controller 22, an operating means (control) 26 is provided at its upper, lower, side surfaces, and etc. The operating means 26 includes two analog joysticks, one cross key, a plurality of button switches, and etc., for example. One analog joystick is used for inputting a moving direction and/or a moving speed or a moving amount of the player character (moving-image character operable by the player using the controller 22) by a slanting amount and a direction of the stick. Another analog joystick controls by a slanting direction a movement of a virtual camera. The cross switch is used for instructing the moving direction of the player character in place of the analog joystick. The button switch is used for instructing the movement of the player character, changing a viewpoint of the virtual camera of a three-dimensional image, adjusting the moving speed of the player character, and so forth. Furthermore, the button switch controls a menu selection, and a pointer or a cursor movement, for example.

It is noted that in this embodiment, the controller 22 is connected to the video game apparatus 12 by the cable 24 integrally provided therewith. However, the controller 22 may be connected to the video game apparatus 12 by another method such as in a wireless manner via an electromagnetic wave (radio wave or infrared ray, for example). In addition, needless to say, specific structure of the operating means 26 of the controller 22 is not limited to the structure of the embodiment, and an arbitrary deformation is possible. One analog joystick may be sufficient, or may not be used at all, for example. The cross switch may not be used.

Below the connector 20 at the front surface of the housing 14 of the video game apparatus 12, at least one (2 in this embodiment) memory slot 28 is provided. A memory card 30 is inserted into this memory slot 28. The memory card 30 is used for loading and temporarily storing a game program, and etc., read out from the optical disk 18, saving game data (result of the game, for example) of the game played using this game system 10, and so forth.

At a rear surface of the housing 14 of the video game apparatus 12, an AV cable connector (not shown) is provided, and using the connector, a monitor 34 is connected to the video game apparatus 12 through an AV cable 32. Typically, the monitor 34 is a color television receiver, and the AV cable 32 inputs a video signal from the video game apparatus 12 to a video input terminal of the color television, and applies a sound signal to an audio input terminal. Therefore, a game image of a three-dimensional (3D) video game is displayed on a screen of the color television (monitor) 34, and a game sound (stereo game sound) such as a game music, a sound effect, and etc., is output from speakers 34a on both sides, for example.

In this game system 10, in order for a user or a game player to play the game (or another application), the player, first, turns on the power of the game apparatus 12, next, the player selects the appropriate optical disk 18 that stores a video game (or another application intended to play) software, and loads the optical disk 18 into the disk drive 16 of the video game apparatus 12. Accordingly, the game apparatus 12 intends to start executing the video game or another application based on the software stored in the optical disk 18. The player operates the controller 22 in order to apply an input to the video game apparatus 12. The player starts the game or another application by operating one of features of the operating means 26, for example. By moving another feature of the operating means 26, it becomes possible to move the moving-image character (player character) to a different direction or change the viewpoint (camera location) of the player in the virtual space of a three-dimensional (3D) game world (hereinafter referred to as "game space").

Figure 2:
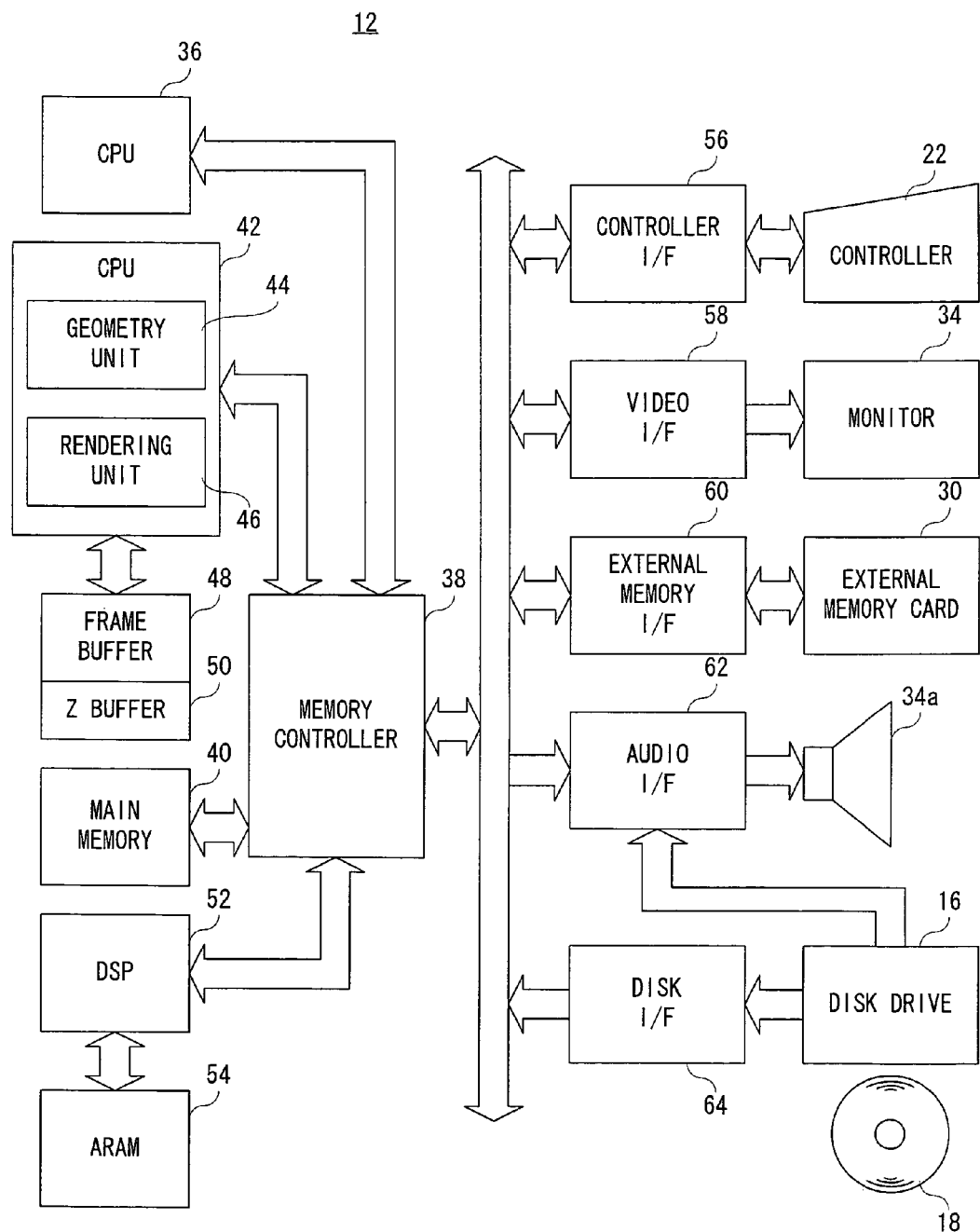
FIG. 2 is a block diagram showing electric structure of a video game system shown in a FIG. 1 embodiment.

FIG. 2 is a block diagram showing electric structure of the video game system 10 of the FIG. 1 embodiment. In the video game apparatus 12, a central processing unit (hereinafter briefly referred to as "CPU") 36 is provided. The CPU 36 is also called as a computer or a processor, and etc., and responsible for entirely controlling the video game apparatus 12. The CPU 36 or computer functions as a game processor, and the memory controller 38 is joined to this CPU 36 via a bus. Primarily, the memory controller 38 controls a writing or a reading of the main memory 40 joined via the bus under the control of the CPU 36. A GPU (Graphics Processing Unit) 42 is joined to the memory controller 38.

The GPU 42 forms one portion of a rendering means, and is constructed of a single chip ASIC, for example, and receives a graphics command (rendering instruction) from the CPU 36 via the memory controller 38 so as to generate a three-dimensional (3D) game image by a geometric unit 44 and a rendering unit 46 according to that command. That is, the geometric unit 44 performs coordinate operation processes such as a rotation, a movement, a deformation, and etc., of various characters and objects in a three-dimensional coordinate system (constructed of a plurality of polygons. In addition, the polygon is a polygonal plain surface defined by at least three vertexes coordinates). The rendering unit 46 applies rendering processes such as attaching a texture (texture image) to each polygon of the various objects, and so forth. Therefore, 3D image data to be displayed on the game screen is generated (created) by the GPU 42, and the image data is rendered (stored) within a frame buffer 48.

It is noted that the data (primitive or polygon or texture, and etc.) necessary for the GPU 42 to execute the graphics command is obtained by the GPU 42 from the main memory 40 via the memory controller 38.

The frame buffer 48 is a memory for rendering (accumulating) the image data worth 1 frame of a luster scanning monitor 34, for example, and rewritten by the GPU 42 by each 1 frame. As a result of a video I/F 58 described later reading out the data of the frame buffer 48 via the memory controller 38 and the GPU 42, the 3D game image is displayed on the screen of the monitor 34.

In addition, a Z buffer 50 has a storing capacity equal to the number of bits of depth data per the number of pixels (storing location or address) corresponding to the frame buffer 48×one pixel, and stores depth information or the depth data (Z value) of dots corresponding to each storing location of the frame buffer 48.

It is noted that both of the frame buffer 48 and the Z buffer 50 may be constructed using one portion of the main memory 40.

The memory controller 38 is also joined to an ARAM 54 via a DSP (Digital Signal Processor) 52. Therefore, the memory controller 38 controls not only the main memory 40 but also the writing and/or reading-out of the ARAM 54 as a sub memory under the control of the CPU 36.

The DSP 52 functions as a sound processor, and generates audio data corresponding to a sound, music, voice necessary for the game by using the sound data (not shown) stored in the main memory 40, using sound waveform data (not shown) written in the ARAM 54, and so forth.

Furthermore, the memory controller 38 is joined to each interface (I/F) 56, 58, 60, 62, and 64 by the bus. The controller I/F 56 is an interface for the controller 22, and applies an operating signal or data of the operating means of the controller 22 to the CPU 36 through the memory controller 38. The video I/F 58 accesses the frame buffer 48, reads out the image data created by the GPU 42, and applies to the monitor 34 the image signal or the image data (digital RGB pixel value) via the AV cable 32 (FIG. 1).

The external memory I/F 60 joins the memory card 30 (FIG. 1) inserted in the front surface of the game apparatus 12 to the memory controller 38. Thereby, it enables the CPU 36 to write the data into this memory card 30 or read out the data from the memory card 30 via the memory controller 38. The audio I/F 62 receives the audio data applied from the DSP 52 through the memory control 38, or audio stream read out from the optical disk 18, and applies to the speaker 34a of the monitor 34 the audio signal (sound signal) corresponding thereto.

Furthermore, the disk I/F 64 joins the disk drive 16 to the memory controller 38, and therefore, the CPU 36 controls the disk drive 16. Program data, the texture data, and etc., read out from the optical disk 18 by this disk drive 16 are written into the main memory 40 under the control of the CPU 36.

Figure 3:
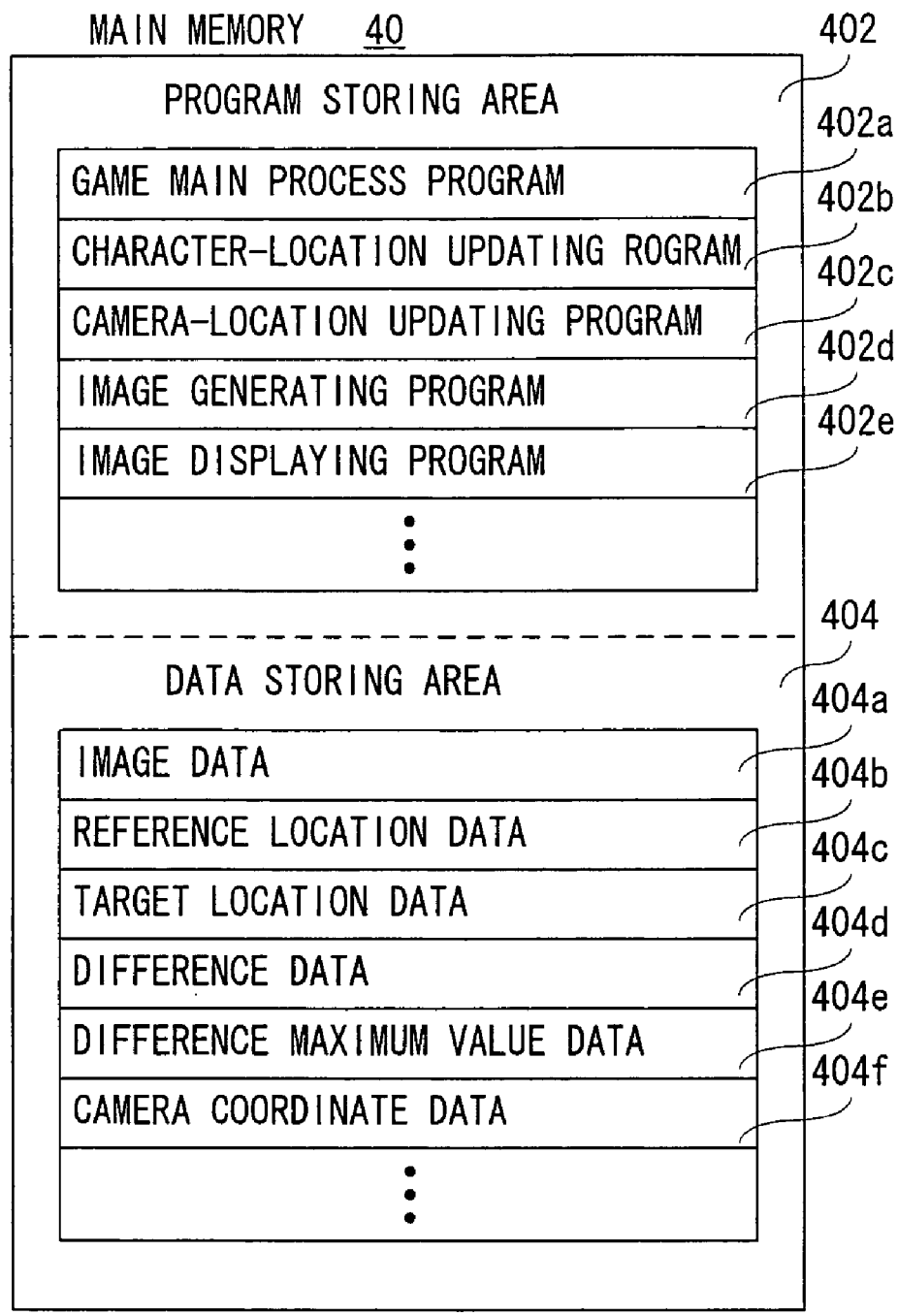
FIG. 3 is an illustrative view showing a memory map of a main memory shown in FIG. 2.

FIG. 3 shows a memory map of the main memory 40. The main memory 40 is constructed of a program storing area 402, and a data storing area 404, for example. In the program storing area 402, a game program read out from the optical disk 18 is stored at once or partially and sequentially. In this embodiment, the game program is constructed of a game main processing program 402a, a character-location updating program 402b, a camera-location updating program 402c, an image generating program 402d, an image displaying program 402e, and etc.

The game main processing program 402a is a program for processing a main routine of the game. The character-location updating program 402b is a program for updating the location of the player character in correspondence with an operation of the player in the game space (world coordinate system). The camera-location updating program 402c is a program for updating in the game space the location of the virtual camera based on the location of the player character updated by the character-location updating program 402b. The image generating program 402d is a program for generating the 3D game image based on the image photographed by the virtual camera that is located in the game space, and follows the player character. The image displaying program 402e is a program for displaying on the monitor 34 the game image generated by the image generating program 402d.

Furthermore, in the data storing area 404, the data read out from the optical disk 18 is stored at once or partially and sequentially, and in addition, the game data, and etc., occurred in concurrent with a proceeding of the game are also temporarily stored. Regarding the data, in this embodiment, image data 404a, reference location data 404b, target location data 404c, difference data 404d, difference maximum value data 404e, camera coordinate data 404f, and etc., are stored.

The image data 404a is the image data of the polygon, the texture, and etc., regarding a plurality of characters and the image data of the game space. Herein, the character refers to the player character, a non-player character, an item character, or a background object (character) such as a wall object or a topography (ground surface) object, and etc. As described above, the player character refers to a character to be moved to a desired direction, and made to execute a desired action by the player. In addition, the non-player character refers to a character to be moved to a direction determined by the program not by a controller operation by the player, or a character such as an enemy character that executes the action determined by the program. Furthermore, the item character refers to a character of an item that the player character obtains or possesses in the game (food, money, medicine, weapon, and etc., for example).

In this embodiment, the reference location data 404b is coordinate data regarding a location of a point of regard (point-of-regard location) that designates a photographing direction (direction) of the virtual camera, and at a time of starting the game, the point of regard is uniquely determined by the location of the player character (character location). In this embodiment, the point-of-regard location at a time of starting the game is determined in a location at the foot of the player character. Detailed descriptions will be given later, and the point-of-regard location (character location) and the location of the virtual camera (camera location) at a time of starting the game have a predetermined relationship (distance relationship). In addition, this reference location data 404b is updated in order corresponding to the character location in an updating process (see FIG. 9) of the camera location described later.

The target location data 404c is coordinate data regarding a location (target location) that serves as a target for allowing the point-of-regard location to be brought close at a predetermined ratio in a case of updating the camera location. In this embodiment, for example, the target location is set to the same location as the character location. However, the target location may be set to a vicinity of the character location, or at predetermined intervals (distances). That is, the target location is determined in a location determined in a predetermined manner depending on the character location.

In this embodiment, the difference data 404d is data regarding a distance (difference) between the target location and the point-of-regard location. That is, this is data regarding a value (absolute value) that subtracts the reference location data 404b from the above-described target location data 404c.

The difference maximum value data 404e is data that defines a maximum value of the difference between the target location and the point-of-regard location. The maximum value is a maximum distance between the target location and the point-of-regard location previously determined in order for the player character not to be protruded from the game screen.

The camera coordinate data 404f is data regarding an updated camera location in the game space calculated based on the difference data 404d, that is, a three-dimensional coordinate of the moved virtual camera. As described later, the camera coordinate data 404f is uniquely determined (calculated) by the point-of-regard location (reference location data 404b) in a case that the point-of-regard location is brought close to the target location at the predetermined ratio using the difference data 404d.

Although not illustrated, in the data storing area 404 stored is audio data, and etc., for sounding (performing) a music (BGM) performed for increasing a liveliness as a part of stage direction in line with the atmosphere of a game stage.

Figure 4:
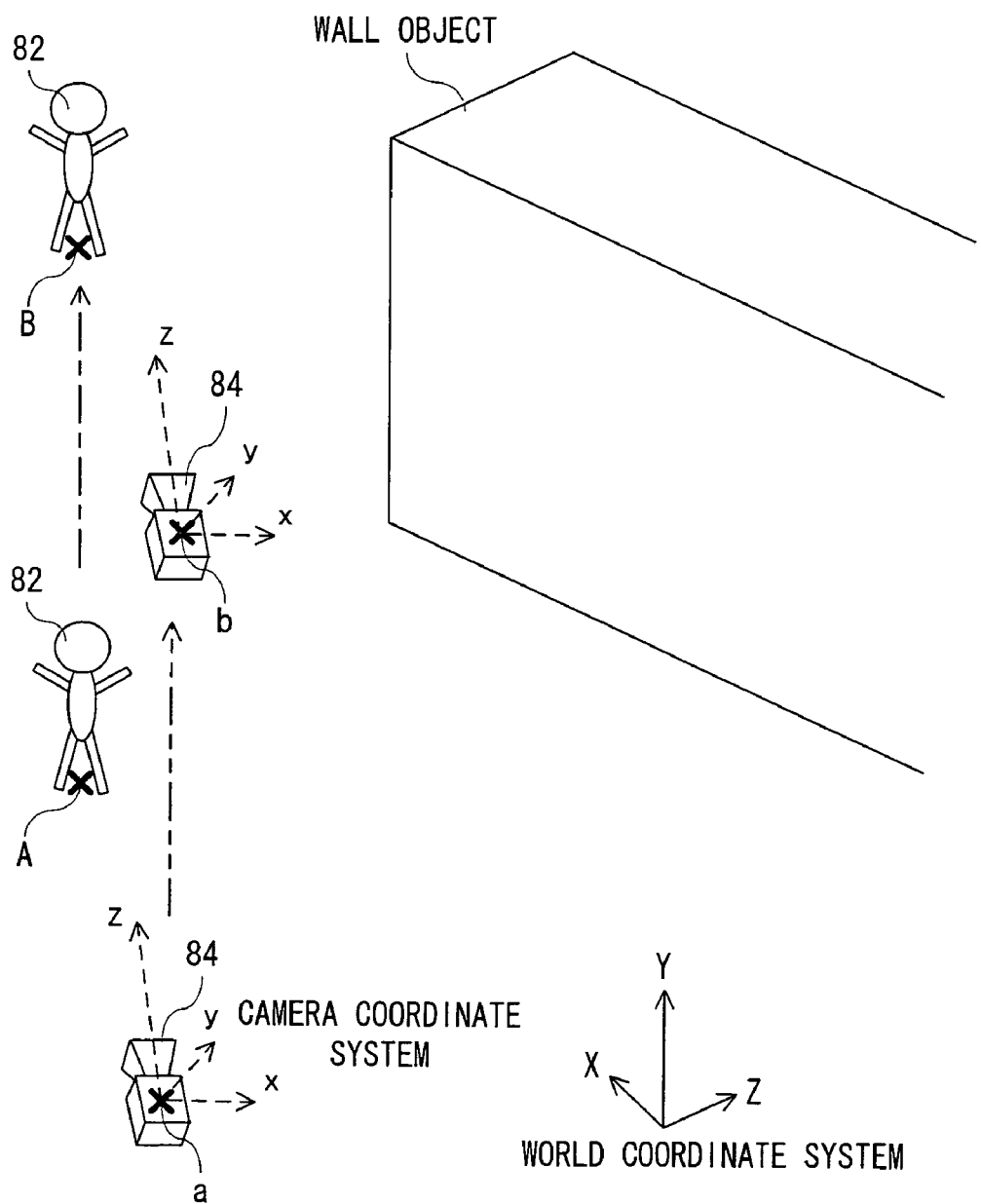
FIG. 4 is an illustrative view showing a location of a player character and a virtual camera in a game space developed by a video game apparatus shown in the FIG. 1 embodiment.

In the game space (world coordinate system) 80 as shown in FIG. 4, for example, in a game that moves the player character 82 according to an operation of the player, the virtual camera 84 that photographs an image for generating the game image displayed on the monitor 34 is arranged in the game space 80. In this embodiment, the virtual camera 84 is far behind (immediately behind) the player character 82 in the game space at a time of starting the game, and is arranged at a distance d on an XZ plain (horizontal direction) and at a distance h in a Y axis direction (vertical direction). This predetermined distance relationship is previously determined by a developer, and et at., such as a game programmer. In addition, the virtual camera 84 follows from its immediately behind in accordance with a movement of the player character 82, and if the player character 82 moves from a location indicated by "A" to a location indicated by "B", for example, the virtual camera 84 is moved from a location indicated by "a" to a location indicated by "b" in accordance therewith.

In such the game, the virtual camera 84 is moved in such a manner as to follow the player character 82, and however, if the virtual camera 84 is moved with the distance d and the distance h described above being maintained (completely linked), even in a case of moving the player character 82 a little, the virtual camera 84 is moved in conjunction therewith, as a result, a game screen with a rigid expression is displayed. In solving this problem, a possible solution may be a method of not completely linking to the movement of the player character 84 by providing a virtual spring between the player character 82 and the virtual camera 84, causing inertia to work toward the movement of the virtual camera 84, and so forth.

However, in a case of providing the virtual spring, there is a problem that it is difficult to play the game because the blurring occurs on the game screen due to elasticity of the spring. In addition, in a case that the inertia is made to work toward the movement of the virtual camera, when the player character 82 makes a sudden stop after being moved at high speed, the virtual camera 84 is too close to the player character 82, and as a result, a game screen difficult to see is displayed. In this case, too, there is a problem that it is difficult to play the game.

Therefore, in this embodiment, in addition to averting such the problem, in order for the virtual camera 84 not to completely link the player character 82, the movement is controlled in such a manner that the virtual camera 84 follows (moves) a little behind the player character 82. The detailed descriptions will be given below.

Figure 5:
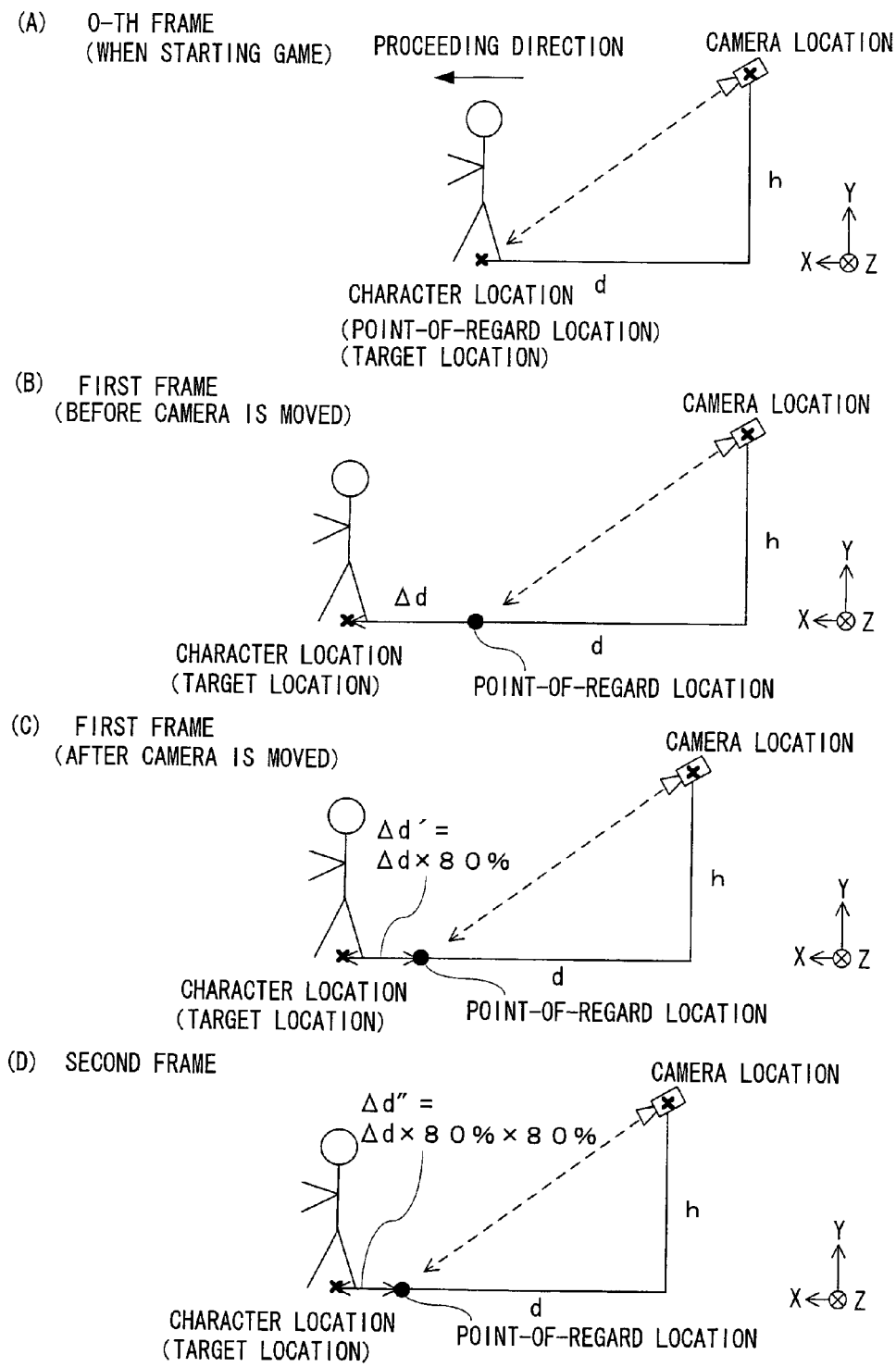
FIG. 5 is an illustrative view showing one example of a following operation of the virtual camera in the game space developed by the video game apparatus shown in the FIG. 1 embodiment.

FIG. 5 is an illustrative view showing for describing a following operation of the virtual camera 84 of a case that the player character 82 moves by a certain distance Δd in a proceeding direction (toward left in FIG. 5), and thereafter, continues stopping.

It is noted that in FIG. 5, for the sake of simplicity, a description regarding only a case that the player character 82 moves (advances) on the XZ plain of the game space 80 in parallel to the X axis is given. That is, the movement in the Z axis direction is disregarded.

As FIG. 5(A) shows, in the 0-th frame, that is, at a time of starting the game, each of the player character 82 and the virtual camera 84 is arranged in a predetermined location (initial location) of the game space 80. At this time, the virtual camera 84 is arranged in a location having the predetermined distance relationship toward the character location. That is, as described above, the virtual camera 84 is arranged far behind the player character 82, and in a location at a distance d from the character location to the X axis direction (on the XY plain), and a distance h in the Y axis direction. In addition, as understood from FIG. 5(A), at a time of starting the game, the character location and the point-of-regard location are coincident to each other. Furthermore, in this embodiment, the character location updated as a result of the player character 82 moving is served as the target location at a time of updating the point-of-regard location so that at a time of starting the game, the point-of-regard location and the target location are coincident to each other.

When the player character 82 moves by a certain distance Δd in the proceeding direction according to the operation of the player, as shown in FIG. 5(B), the target location and the point-of-regard location are separated by the distance Δd in a subsequent 1 frame (in the first frame). The distance Δd is calculated based on a coordinate (three-dimensional coordinate) in the world coordinate system between the target location and the point-of-regard location.

If it is assumed that the three-dimensional coordinate of the target location is (X1, Y1, Z1), the three-dimensional coordinate of the point-of-regard location is (X2, Y2, Z2), and the three-dimensional coordinate of the camera location is (X3, Y3, Z3), the distance Δd is evaluated by Equation 1. However, the target location and the point-of-regard location are set at the foot of the player character 82 so that in a case of calculating the distance Δd, it is possible to disregard a Y component.

It is noted that in a case that the player character 82 moves in a place with roughness, the roughness is disregarded, that is, the Y component is disregarded, and a subtraction or a addition may be applied to the Y component by a height equal to the roughness by using a horizontal surface as a reference after calculating the three-dimensional coordinate of the point-of-regard location.

$$\Delta d = \sqrt{(X1-X2)^2} \qquad \text{[Equation 1]}$$

Herein, the character location is updated from the initial location arranged at a time of starting the game according to the operation of the player, and is always recognized so that the three-dimensional coordinate of the character location, that is, the target location, is well known. In addition, the point-of-regard location in FIG. 5(B) is coincident with the character location (initial location) in which the player character 82 is arranged at a time of starting the game so that this three-dimensional coordinate is also well known. Therefore, the distance Δd is to be easily calculated.

In this embodiment, the point-of-regard location is brought close to the target location in such a manner that the distance Δd thus calculated is reduced (minimized) at the predetermined ratio (in this embodiment, 20%), and the location of the virtual camera 84 is updated in such a manner as to possess the predetermined distance relationship with the updated point-of-regard location. Thus, the virtual camera 84 is followed behind the movement of the player character 82 with some delay.

More specifically, after calculating the difference, that is, the distance Δd, using Equation 1, an X coordinate (X2') of the point-of-regard location brought close to the target location by a 20% distance of the distance Δd is calculated according to Equation 2.

$$\Delta d' = \Delta d \times 80\% = \sqrt{(X1-X2')^2} \qquad \text{[Equation 2]}$$

Herein, Δd is evaluated according to Equation 1, and in addition, X1 is well known so that the X coordinate (X2') of the moved point-of-regard location can be easily calculated. It is noted that in Equation 2, the distance that the point-of-regard location is brought closer to the target location by the predetermined ratio is Δd'.

Therefore, a three-dimensional coordinate (X2', Y2, Z2) of the moved point-of-regard location is evaluated. Next, an X coordinate (X3') of the moved camera location distant from the point-of-regard location by the distance d of the X direction is calculated according to Equation 3.

$$X3' = X2' - d \qquad \text{[Equation 3]}$$

Herein, d is a setting value, and X2' is calculated according to Equation 2 so that the X coordinate (X3') of the moved camera location can be easily calculated. Therefore, a three-dimensional coordinate (X3', Y3, Z3) of the moved virtual camera 84 is evaluated. The virtual camera 84 is moved to the location indicated by this three-dimensional coordinate (X3', Y3, Z3), and then, a state as shown in FIG. 5(C) is established. In addition, at this time, the virtual camera 84 is directed toward the three-dimensional coordinate (X2', Y2, Z2) of the moved point-of-regard location evaluated according to Equation 2.

In this embodiment, for example, the CPU 36 detects a buffer (not shown) provided in the controller I/F 56 at intervals of predetermined number of frames, and obtains operating information of the controller 22 (operating means 26) so as to detect the movement or a suspension of the player character 82. Then, according to the movement/suspension of the player character 82, the movement of the virtual camera 84 is executed at intervals of 1 frame. That is, the camera location is updated by each 1 frame, and the game screen is updated in concurrent therewith.

Herein, the interval of frames is a unit that represents a time period from one screen of the image is generated until to be displayed, and in a case that the frame rate is 60fps, for example, 1/60 seconds is the interval of frames. Therefore, if the predetermined number is "1", this means to obtain the operating information during a 1 frame (during 1/60 seconds, for example). In addition, if the predetermined number is "2", this means to obtain the operating information during 2 frames (during 2/60 seconds, for example).

Then, in a succeeding 1 frame (the second frame), the camera location is further updated in such a manner that the point-of-regard location is brought closer to the target location by the predetermined ratio from the state shown in FIG. 5(C). As described above, the player character 82 continues stopping in that location after moving by the distance Δd so that in the second frame shown in FIG. 5(D), the point-of-regard location is brought close to the target location in such a manner that the distance Δd' is reduced to 80% (Δd'') thereof.

That is, in the above-described Equation 2 and Equation 3, if Δd' is changed to Δd'', the three-dimensional coordinate of the point-of-regard location yet to be moved is rendered (X2', Y2, Z2), and the three-dimensional coordinate of the camera location yet to be moved is (X3', Y3, Z3), the three-dimensional coordinate (X2'', Y2, Z2) of the moved point-of-regard location, and the three-dimensional coordinate (X3'', Y3, Z3) of the moved camera location can be easily calculated.

It is noted that the distance Δd' that the point-of-regard location is yet to be moved is as evaluated according to above-described Equation 2.

In addition, although not illustrated, after the third frame, too, similarly, the updating process of the camera location is repeated, and the virtual camera 84 gradually comes close to the stopping (stationary) player character 82.

As described above, in the example shown in FIG. 5, for the sake of simplicity, the description is given regarding a case that the player character 82 moves parallel to the X axis on the XZ plain of the game space. However, in a case of moving parallel to the Z axis, only the Z component may be calculated while the X component and the Y component are disregarded. That is, X shown in Equations 1-3 may be replaced to Z.

In addition, in a case that the player character 82 moves obliquely on the XZ plain, the coordinate of the X component is calculated while the Y component and the Z component are disregarded, and the coordinate of the Z component is calculated while the X component and the Y component are disregarded. Thus, the three-dimensional coordinate of the moved point-of-regard location can be calculated. Furthermore, the three-dimensional coordinate of the camera location having the predetermined distance relationship with the point-of-regard location may be calculated on a line that connects the character location and the moved point-of-regard location, and far behind the player character 82.

Figure 6:
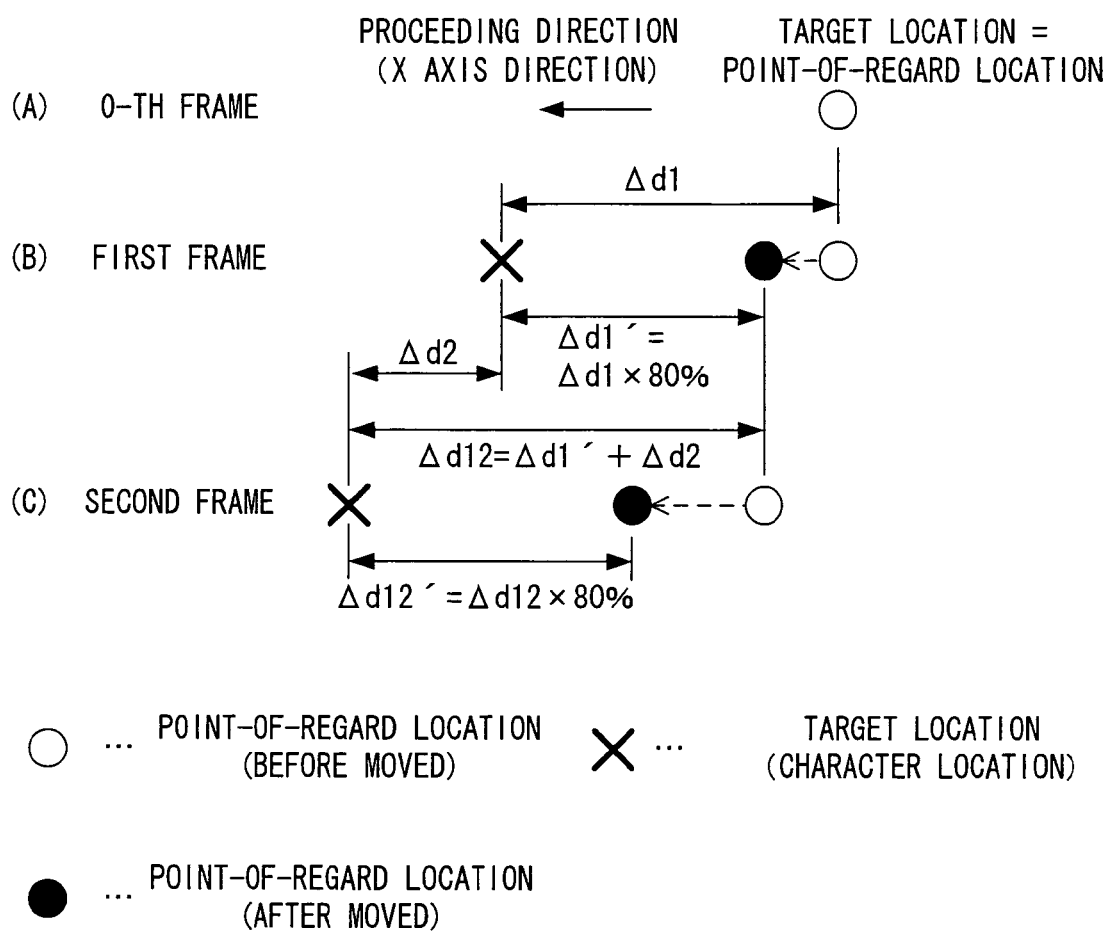
FIG. 6 is an illustrative view showing another example of the following operation of the virtual camera in the game space developed by the video game apparatus shown in the FIG. 1 embodiment.

FIG. 6 is an illustrative view for describing the following operation of the virtual camera 84 in a case that the player character 82 continues moving in the proceeding direction.

It is noted that in FIG. 6, similar to the case shown in FIG. 5, for the sake of simplicity, a description will be given regarding a case that the player character 82 moves parallel to the X axis on the XZ plain of the game space 80. In addition, for the sake of illustration, in FIG. 6, the player character 82 and the virtual camera 84 are omitted. Furthermore, regarding the same portion as a content described using FIG. 5, only a simple description will be given.

As shown in FIG. 6(A), in the 0-th frame, that is, at a time of starting the game, similar to the case shown in FIG. 5(A), the player character 82 is arranged in the initial location of the game space 80. At this time, the character location, the target location, and the point-of-regard location are in the same location. According to the operation of the player, when the player character 82 moves a certain distance Δd1 in the proceeding direction (toward left in FIG. 6(A)), as shown in FIG. 6(B), the target location is moved in the first frame. In addition, at this time, the point-of-regard location is brought close to the target location by a distance equal to the predetermined ratio (20% of the distance Δd1) of the difference Δd1. Then, the camera location, too, is updated in correspondence with the updated point-of-regard location. The updating of the point-of-regard location and the camera location shown in FIG. 6(B) is the same as the case described using FIG. 5(B) and FIG. 5(C) so that a detailed description will be omitted.

Furthermore, when the player character 82 moves in the succeeding 1 frame (the second frame) by a certain distance Δd2, the target location is updated as shown in FIG. 6(C). That is, a distance (difference) Δ12 between the point-of-regard location and the updated target location shown in FIG. 6(B) can be evaluated by Equation 4.

$$\Delta d12 = \Delta d1 \times 80\% + \Delta d2 \quad \text{[Equation 4]}$$

In the second frame, the point-of-regard location is brought closer to the target location in such a manner that this difference Δ12 is reduced by the predetermined ratio, and in correspondence therewith, the camera location, too, is updated. A calculating method of the X axis of the point-of-regard location and the camera location is the same as the case described using Equation 2 and Equation 3 so that duplicated descriptions will be omitted.

Thus, in a case that the player character 82 continues moving, the distance that the player character 82 has moved by each 1 frame is added to the difference. Except therefor, it is the same as the case shown in FIG. 5.

In FIG. 6, too, for the sake of simplicity, a description is given regarding a case that the player character 82 moves in the X axis direction on the XZ plain of the game space 80. On the other hand, in a case of moving in the Z axis direction, the moved point-of-regard location and camera location can be calculated while the X component and the Y component are disregarded.

In addition, in a case that the player character 82 moves obliquely on the XZ plain of the game space 80, by calculating regarding each of the X axis direction and the Z axis direction, the moved point-of-regard location and the three-dimensional coordinate can be calculated. Furthermore, the three-dimensional coordinate of the moved camera location can also be calculated based on the coordinate of the moved point-of-regard location.

Furthermore, as the case shown in FIG. 6, in a case that the player character 82 continues moving, there is a case that if a moving speed of the player character 82 is too fast, even if the point-of-regard location is brought closer at the predetermined ratio, the virtual camera 84 can not follow in a timely manner, and therefore, the player character 82 deviates from the game screen. To avert this problem, in this embodiment, a maximum value (maximum distance) of the difference between the target location and the point-of-regard location is previously set, and in a case that the difference exceeds the maximum distance, the point-of-regard location is made to be forcedly moved to a location distant by the maximum distance. This prevents an unfavorable game screen from being displayed.

It is noted that in this embodiment, in a case that the difference exceeds the maximum distance, the point-of-regard location is made to be moved to the location distant by the maximum distance. However, this is not always the case, and as long as the point-of-regard location is within the maximum distance, the point-of-regard location may be set to a location at a certain distance.

Figure 7:
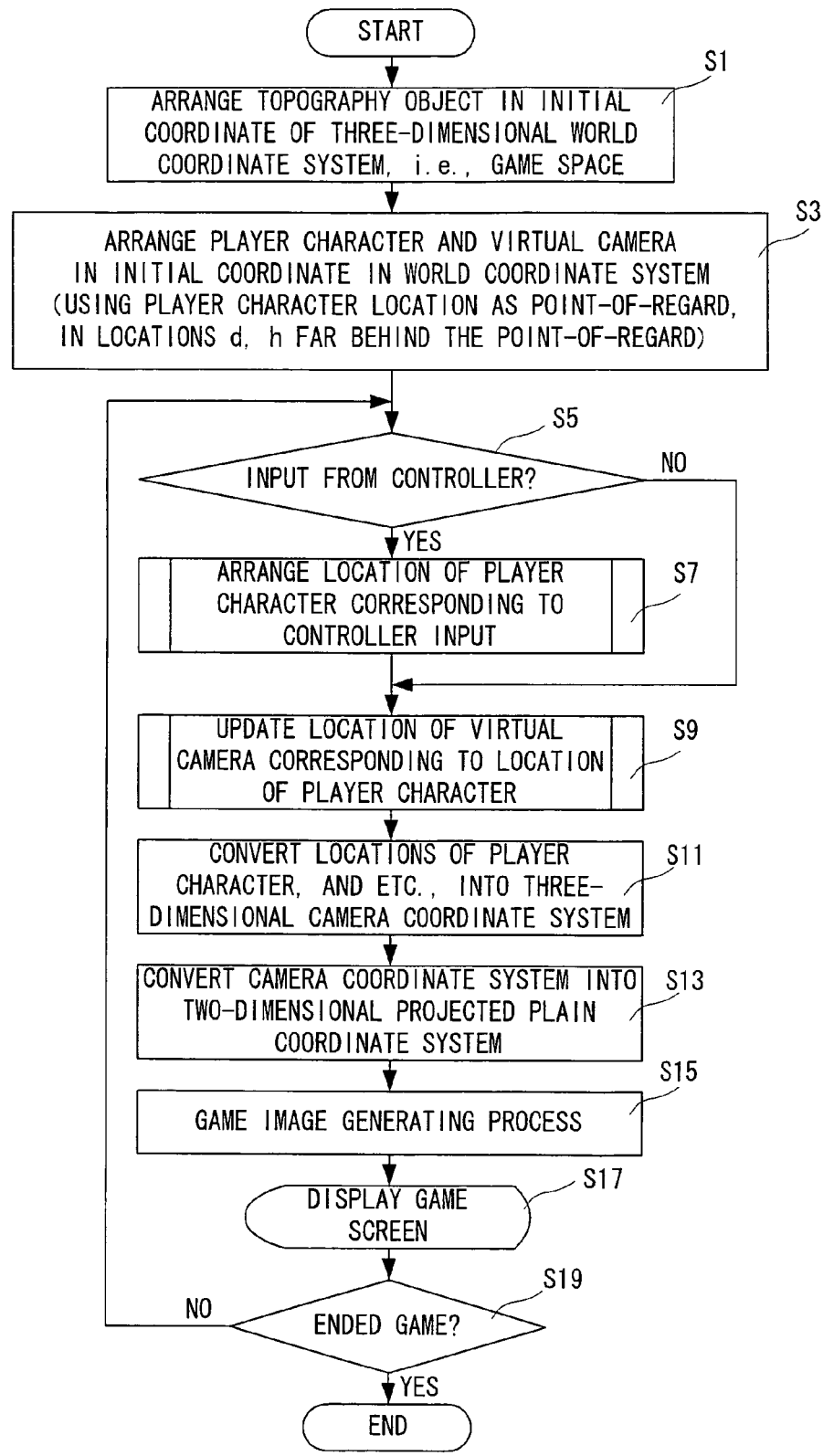
FIG. 7 is a flowchart showing one example of a generating operation in a game screen of a CPU shown in FIG. 2.

FIG. 7 is a flowchart showing a game screen displaying process of this embodiment. Referring to this FIG. 7, when the player starts a game play, the CPU 36 starts the game screen displaying process. In a step S1, the topography object is arranged in the game space 80, that is, an initial coordinate of the three-dimensional world coordinate system. In a succeeding step S3, into the world coordinate system, the player character 82 and the virtual camera 84 are arranged in the initial coordinate. As shown in FIG. 5(A), and FIG. 6(A), at a time of starting the game, using the character location as the point-of-regard (point-of-regard location), the virtual camera 84 is arranged in the location distant by the distance d far behind the point-of-regard location, and in addition, is arranged in a location distant in the Y axis (height) direction by the distance h. Furthermore, at this time, its direction is set in such a manner that the virtual camera 84 faces the point-of-regard location.

Subsequently, in a step S5, it is determined whether or not there is an input from the controller 22 (operating means 26). If "NO" in the step S5, that is, if there is no input from the controller 22, the process directly advances to a step S9. On the other hand, if "YES" in the step S5, that is, if there is the input from the controller 22, the process updates the location of the player character 82 in correspondence with the input of the controller 22 in a step S7, and then, advances to the step S9. That is, in the step S7, an updating process (see FIG. 8) of the character location described later is executed.

In the step S9, the location of the virtual camera 84 is updated in correspondence with the location of the player character 82. That is, the updating process (see FIG. 9) of the camera location described later is executed. In a succeeding step S11, the locations of the player character 82, and etc., are converted into a three-dimensional camera coordinate system. Although not illustrated, to be simply described, the world coordinate system such as the player character 82 and the topography object, and the enemy character, the item character, and etc., as required, are converted into the camera coordinate system. That is, the three-dimensional coordinates of the camera location, the player character 82, and etc., are converted in such a manner that the three-dimensional coordinate of the virtual camera 84 is rendered an original location (0, 0, 0).

Subsequently, in a step S13, for displaying the game screen on the monitor 34, the three-dimensional camera coordinate system is converted into a two-dimensional projected plain coordinate system, and in a step S15, a game image generating process is executed. That is, the CPU 36 applies the graphics command to the GPU 42, and the geometry unit 44 and the rendering unit 46 generate the 3D image data according to the command.

It is noted that, although not illustrated, in a step S13, the three-dimensional camera coordinate system is converted into the two-dimensional projected plain coordinate system, and in addition, a designating of the texture and a clipping (clipping of an invisible world) is executed at the same time.

In a step S17, the generated image is displayed on the monitor 34. That is, the GPU 42 rewrites the image data within the frame buffer 48 by each 1 frame, and in addition, the video I/F 58 reads out the data of the frame buffer 48 via the memory controller 38 so that the 3D game image is displayed on the screen of the monitor 34.

In a succeeding step S19, it is determined whether or not the game is ended. If "NO" in the step S19, that is, unless the game is not ended, the process returns to the step S5. On the other hand, if "YES" in the step S19, that is, if the game is ended, the process ends the game process.

It is noted that as described above, the CPU 36 executes the game image displaying process in such a manner as to carry out a process of the step S5 by each 1 frame.

Figure 8:
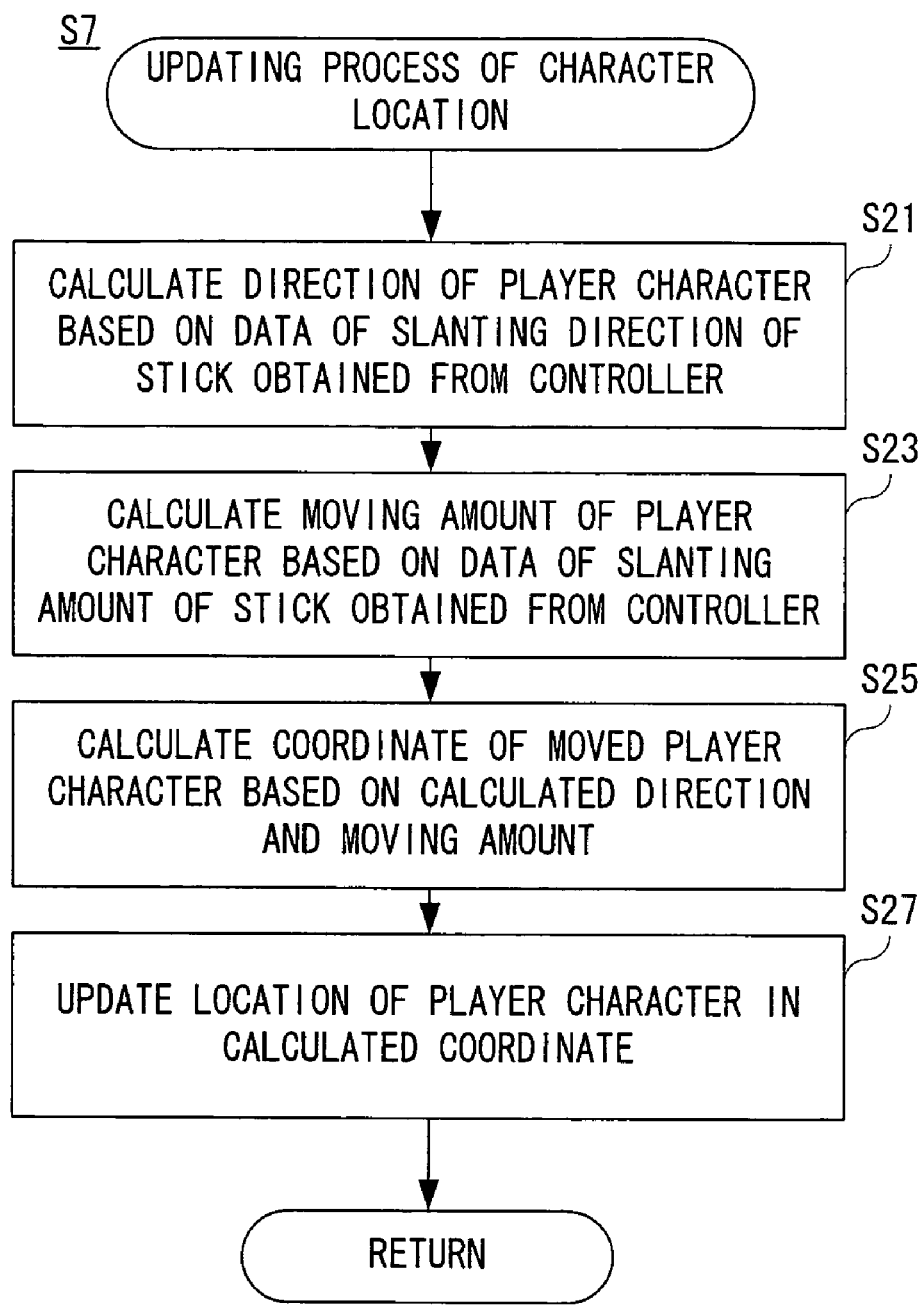
FIG. 8 is a flowchart showing one example of an updating operation of a character location of the CPU shown in FIG. 2.

FIG. 8 is a flowchart showing the updating process of the character location executed in the step S7 in FIG. 7. When the CPU 36 starts the updating process of the character location in a step S21, the direction of the player character 82 is calculated (detected) based on the data of the slanting direction of the stick (analog joystick) obtained from the controller 22.

That is, the proceeding direction of the player character 82 is calculated on the XZ plain of the world coordinate system.

In a succeeding step S23, based on the data of the slanting amount of the stick, a moving amount of the player character 82 is calculated. Next, in a step S25, based on the moving direction and the moving amount of the calculated player character 82, the three-dimensional coordinate regarding the location of the moved player character 82 is calculated. That is, the target location data 404c is calculated.

Then, in a step S27, the location of the player character 82 is updated to the calculated three-dimensional coordinate, that is, the calculated target location data 404c is written (overwritten) into the data storing area 404 of the main memory 40, and then, the process returns the updating process of the character location.

Figure 9:
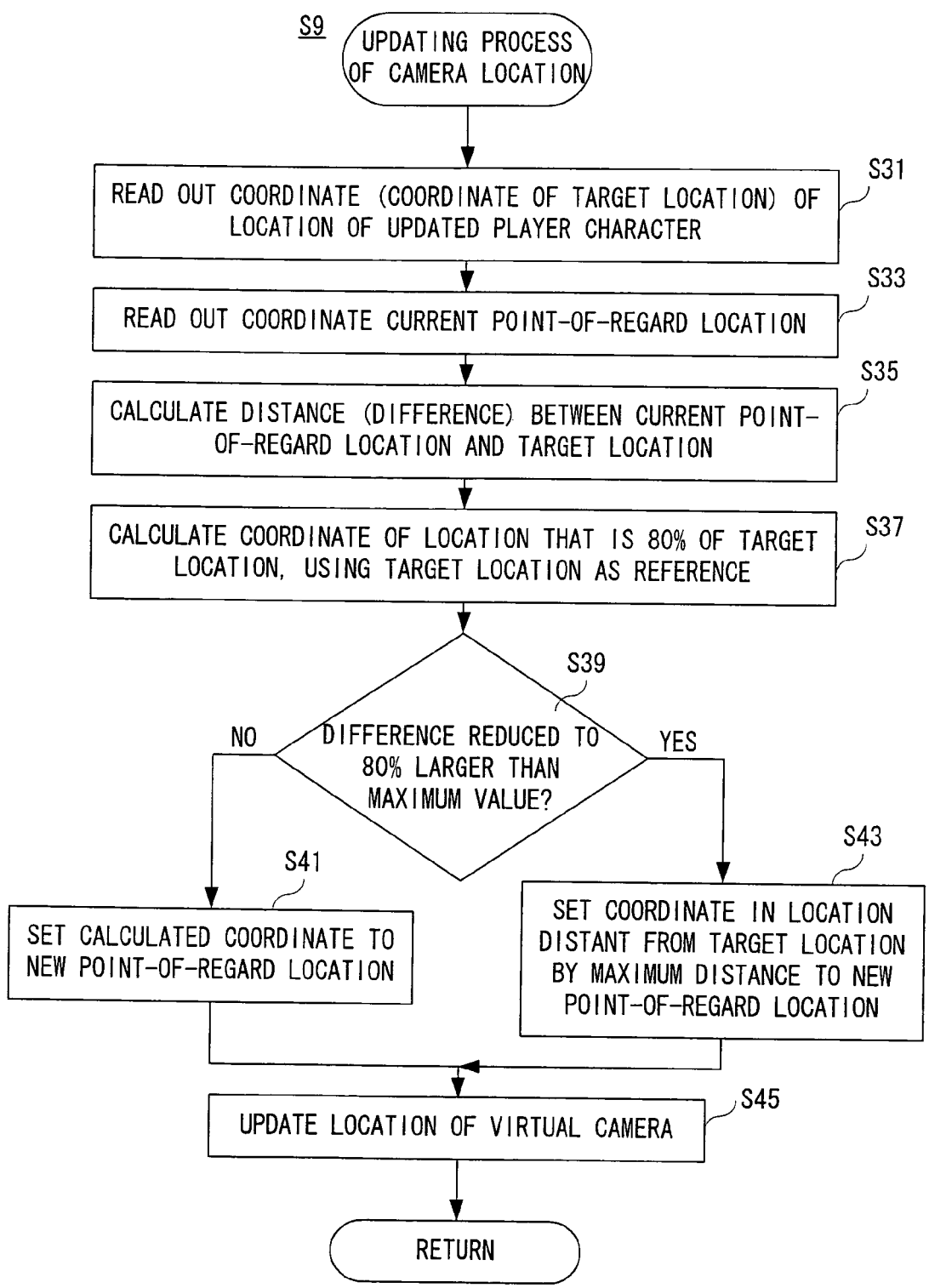
FIG. 9 is a flowchart showing one example of an updating operation of a camera location of the CPU shown in FIG. 2.

In addition, FIG. 9 is a flowchart showing the updating process of the camera location executed in the step S9 shown in FIG. 7. When the CPU 36 starts the updating process of the camera location in a step S31, the three-dimensional coordinate (three-dimensional coordinate of the target location) regarding the location of the updated player character 82, that is, the target location data 404c, is read out. In a succeeding step S33, the coordinate of the current point-of-regard location, that is, the reference location data 404b, is read out.

Next, in a step S35, the distance between the current point-of-regard location and the target location, that is, the difference, is calculated, and the difference data 404d is written (overwritten) into the data storing area 404 of the main memory 40. Furthermore, in a step S37, using the target location as a reference, the location that is 80% of the difference, that is, the coordinate of the moved reference location, is calculated. Then, in a step S39, it is determined whether or not the difference that is rendered 80% is larger than the maximum value. That is, by comparing the value of the difference data 404d that is rendered 80% with the difference maximum value data 404e, it is determined whether or not the distance (difference) from the target location to the moved point-of-regard location exceeds the maximum distance.

If "NO" in the step S39, that is, in a case that the difference that is rendered 80% is smaller than the maximum value, in a step S41, the coordinate calculated in the step S37 is set as a new point-of-regard location, and then, the process advances to a step S45. On the other hand, if "YES" in the step S39, that is, in a case that the difference that is rendered 80% is larger than the maximum value, in a step S43, a coordinate in a location distant from the target location by the maximum distance is set as the new point-of-regard location, and then, the process advances to the step S45. That is, in the steps S41 and S43, the reference location data 404b is updated. In addition, although not illustrated, at this time, the camera coordinate data 404f regarding the location of the camera having the predetermined relationship with the reference location, that is, the point-of-regard location, is also updated.

In the step S45, the location of the virtual camera 84 is updated, and then, the updating process of the camera location is returned. In this step S45, the virtual camera 84 is moved to the location indicated by the updated camera coordinate data 404f, and in addition, the direction of the virtual camera 84 is set in such a manner that the virtual camera 84 faces the location indicated by the reference location data 404b.

It is noted that in this embodiment, as shown in FIG. 7, in a case of determining that there is no input from the controller 22 in the step S5, the process directly advances to the step S9 so as to update the location of the virtual camera. However, in a case that the player character 82 is not moved from a time of starting the game, there is a case that the virtual camera 84 may be too close to the player character 82. To avert this, after "NO" is determined in the step S5, whether or not the input from the controller 22 is ever detected is made to be determined, and in a case that no input is detected from the controller 22, the process is made to return to the step S5, immediately after the game is started, the virtual camera 84 may be prevented from being brought to close to the player character 82. On the other hand, immediately after starting the game, in a case of detecting the input from the controller 22 once, the process may advance to the step S9 so as to execute the updating process of the camera location.

According to this embodiment, the camera location is updated in such a manner that the point-of-regard location is brought close to the target location at the predetermined ratio, thus possible to follow from a little behind the player character. In addition, an unfavorable game screen such as an oscillated game screen is not to be displayed. That is, it is possible to display the game screen with a gentle expression, and easy to play.

Furthermore, the camera location is updated in such a manner that the point-of-regard location is brought close to the target location at the predetermined ratio, that is, the same process is repeated irrespective of presence or absence of the movement or the moving speed of the player character 82, it is possible to make a bug less likely to occur to the updating process of the camera location and the game screen displaying process. In other words, it is possible to reduce a cause of the occurrence of the bug, thus reducing a de-bugging task.

It is noted that in this embodiment, a description is given only to the video game apparatus connected to the monitor. However, it is needless to say that this is adaptable to a game apparatus having the monitor to be integrally provided thereto, a handheld game apparatus, a handheld telephone receiver with a game function, and etc.

The video game system 10 of another embodiment is the same as the above-described embodiment except that the updating process of the camera location in the game apparatus 12 is different so that duplicated descriptions will be omitted. In this game apparatus 12 of another embodiment uses the camera location (initial location of the virtual camera 84) arranged at a time of starting the game as the reference location, moves (updates) this reference location to be linked to the player character 82, sets the updated reference location as the target location so as to update the camera location in such a manner that the distance (difference) between the target location and the camera location is reduced (minimized) at the predetermined ratio. Thus, the target location and the updated reference location is coincident, in another embodiment, the reference location data 404b needs not to be stored in the data storing area 404 of the main memory 40 shown in FIG. 3.

Figure 10:
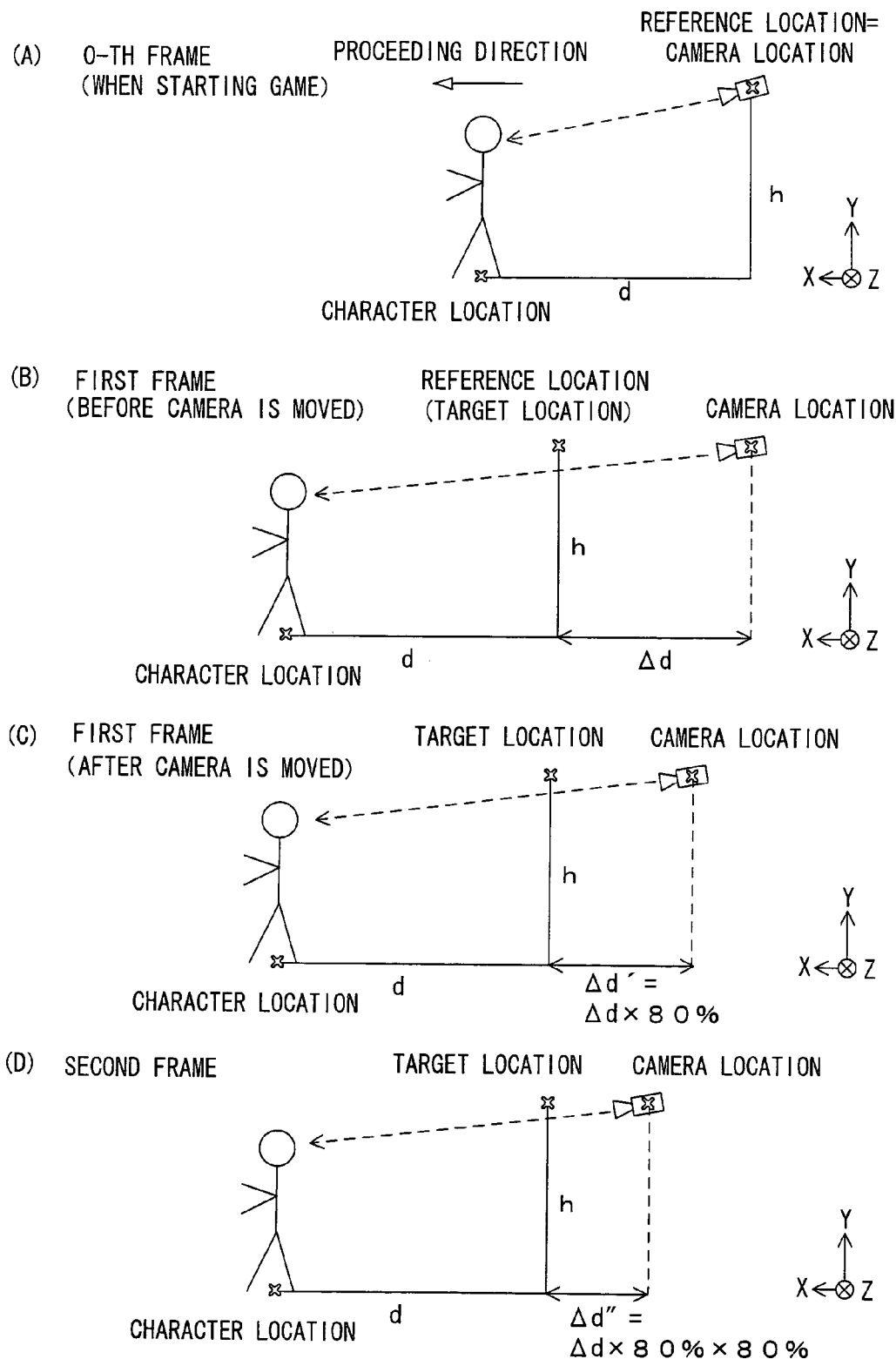
FIG. 10 is an illustrative view showing one example of the following operation of the virtual camera in the game space developed by a video game apparatus of another embodiment

FIG. 10 is an illustrative view for describing the following operation of the virtual camera 84 in a case of continuing stopping after the player character 82 moves by a certain distance Δd in the proceeding direction.

It is noted that in FIG. 10, for the sake of simplicity, a description will be given regarding a case that the player character 82 moves in parallel to the X axis on the XZ plain of the game space 80.

More specifically, as in FIG. 10(A), in the 0-th frame, that is, at a time of starting the game, similar to the above-described embodiment, both the player character 82 and the virtual camera 84 are arranged in the initial location of the world coordinate system.

In a succeeding 1 frame (the first frame), when the player character 82 moves by the certain distance Δd, the reference location having the predetermined relationship with the character location, that is, the point-of-regard location, is moved from the original location (camera location) by the distance Δd in such a manner as to be linked to the moving direction of the player character 82 as shown in FIG. 10(B). In another embodiment, the camera location is made to be moved in such a manner that the distance between the moved reference location, that is, the target location, and the camera location is reduced at the predetermined ratio.

That is, the three-dimensional coordinate in the world coordinate of the camera location shown in FIG. 10(A) and FIG. 10(B) is rendered (X4, Y4, Z4), and the moved reference location, that is, the three-dimensional coordinate in the world coordinate system of the target location, shown in FIG. 10(B) is rendered (X5, Y5, Z5). In addition, it is assumed that the player character 82 moves in parallel to the X axis so that it is possible to calculate the distance Δd by only taking into consideration the X component of each three-dimensional coordinate. That is, it is possible to disregard the Y component and the Z component. This point is the same as the above-described embodiment, and thus, possible to calculate according to Equation 5.

$$\Delta d = \sqrt{(X5-X4)^2} \qquad \text{[Equation 5]}$$

This distance (difference) Δd is brought close at the predetermined ratio (20%) so that the distance Δd' between the moved camera location and the target location is calculated according to Equation 6.

$$\Delta d' = \Delta d \times 80\% \qquad \text{[Equation 6]}$$

That is, it is possible to calculate the X coordinate (X4') of the moved camera location shown in FIG. 10(C) according to Equation 7.

$$X4' = X5 - \Delta d' \qquad \text{[Equation 7]}$$

Herein, the X5 has the predetermined distance relationship with the character location (point-of-regard location), and is the reference location (target location) to be completely linked so that it is possible to calculate the X5 only by adding the distance Δd to the X coordinate of the character location. In addition, Δd' is evaluated according to Equation 6. Thus, it is possible to easily calculate the X coordinate (X4') of the moved camera location. Therefore, the three-dimensional coordinate (X4', Y4, Z4) of the moved camera location is evaluated.

Furthermore, in a succeeding 1 frame (the second frame), the camera location is moved in such a manner that the distance Δd' is brought close at the predetermined ratio. The moved distance Δd" is evaluated according to Equation 6, and in addition, the X coordinate (Z4") of the moved camera location can be calculated according to Equation 7, using the calculated distance Δd". That is, Δd may be changed to Δd', and Δd' may be changed to Δd" in Equation 6. In addition, X4' may be changed to X4", and Δd' may be changed to (Δd'+Δd") in Equation 7. Therefore, it becomes possible to calculate the three-dimensional coordinate (X4", Y4, Z4) of the moved camera location in the second frame.

In FIG. 10, for the sake of simplicity, the description is given regarding only a case that the player character 82 moves in parallel to the X axis. In addition, in a case that the player character 82 moves in parallel to the Z axis, too, the camera location can similarly be updated. However, in this case, the three-dimensional coordinate of the target location and the three-dimensional coordinate of the moved camera location based on the Z component are evaluated while the X component and the Y component are disregarded.

Furthermore, in a case that the player character 82 moves obliquely on the XZ plain of the game space 80, the X component is calculated while the Y component and the Z component are disregarded, and the Z component is calculated while the X component and the Y component are disregarded, and thus, possible to calculate both the X component and the Z component of the three-dimensional coordinate of the moved camera location.

Figure 11:
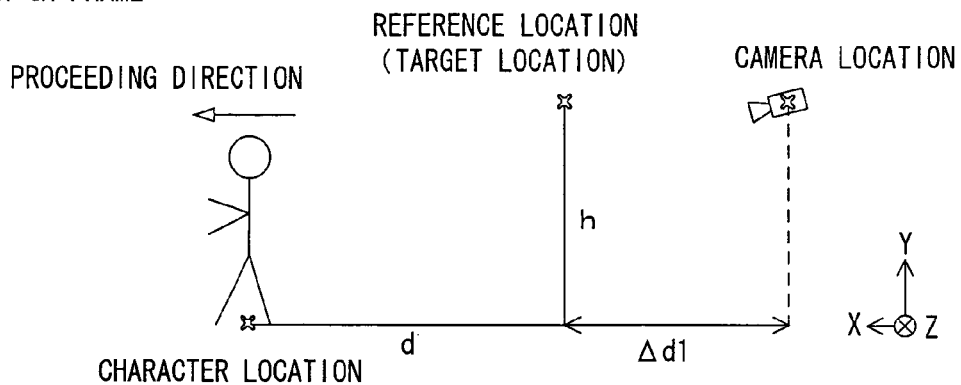
FIG. 11 is an illustrative view showing another example of the following operation of the virtual camera in the game space developed by the video game apparatus of another embodiment.
Figure 11:
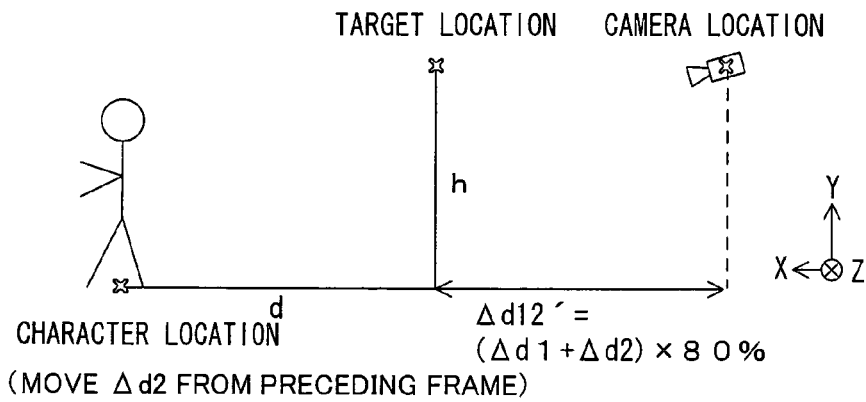
Figure 11:
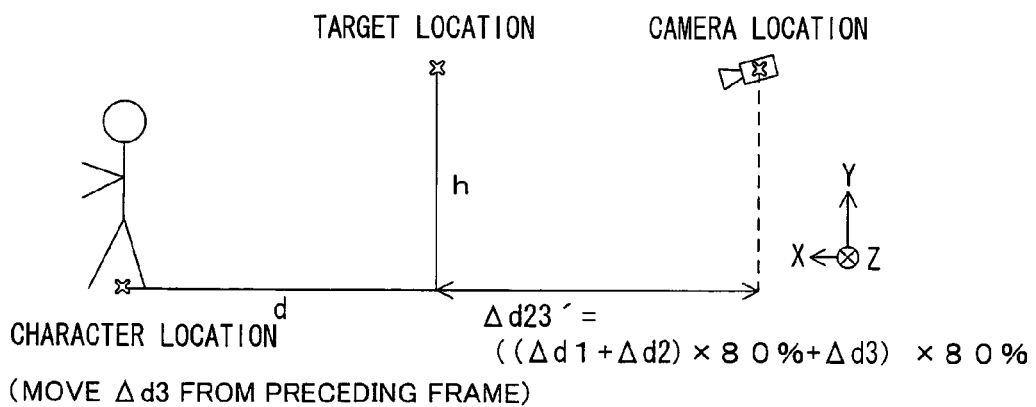

FIG. 11 is an illustrative view for describing the following operation of the virtual camera 84 regarding a case that the player character 82 continues moving on the XZ plain of the game space 80 in parallel to the X axis. In the n-th (n is an integral numeral of 1 or more) frame, FIG. 11(A) shows the character location, the reference location (target location), and the camera location in a case that the player character 82 moves only by Δd1.

It is noted that Δd1 shown in FIG. 11(A) is equal to the distance that is rendered 80% of the difference between the distance that the player character 82 has moved in the immediately previous frame (the n-th−1 frame), that is, the target location, and the camera location.

If the player character 82 moves by a distance Δd2 in a succeeding 1 frame, that is, in the (n+1)-th frame, the difference Δd12 between the reference location and the camera location is calculated according to Equation 8.

$$\Delta d12 = \Delta d1 + \Delta d2 \quad \text{[Equation 8]}$$

As shown in FIG. 11(B), in the (n+1)-th frame, the camera location is updated in such a manner that this difference Δd12 is reduced at the predetermined ratio. That is, the difference Δd12 is reduced by the predetermined ratio according to Equation 9.

$$\Delta d12' = \Delta d12 \times 80\% = (\Delta d1 + \Delta d2) \times 80\% \quad \text{[Equation 9]}$$

Using Δd12' calculated according to this Equation 9, the X coordinate of the moved camera location is calculated. It is noted that, similar to the above-described embodiment, an example shown in FIG. 11 is similar to the case shown in FIG. 10 except that the distance that the player character 82 has moved is added to the difference so that detailed descriptions regarding a calculation of the X coordinate of the moved camera location will be omitted. Hereinafter, the same.

When the player character 82 moves by a distance Δd3 in a further succeeding 1 frame, that is, in the (n+2)-th frame, a difference Δd23 between the reference location and the camera location is calculated according to Equation 8.

$$\Delta d23 = \Delta d12 \times 80\% + \Delta d3 = (\Delta d1 + \Delta d2) \times 80\% + \Delta d3 \quad \text{[Equation 10]}$$

As shown in FIG. 11(C), in the (n+2)-th frame, the camera location is reduced in such a manner that this difference Δd23 is reduced at the predetermined ratio.

It is noted that in FIG. 11, for the sake of simplicity, a description is given regarding only a case that the player character 82 moves on the XZ plain in parallel to the X axis. In addition, in a case that the player character 82 moves in parallel to the Z axis, too, the camera location can be similarly updated. In addition, in a case that the player character 82 moves obliquely on the XZ plain, the X component is calculated while the Y component and the Z component are disregarded, and in addition, the Z component is calculated while the X component and the Y component are disregarded, and thus, possible to calculate both the X component and the Z component of the three-dimensional coordinate of the moved camera location.

Figure 12:
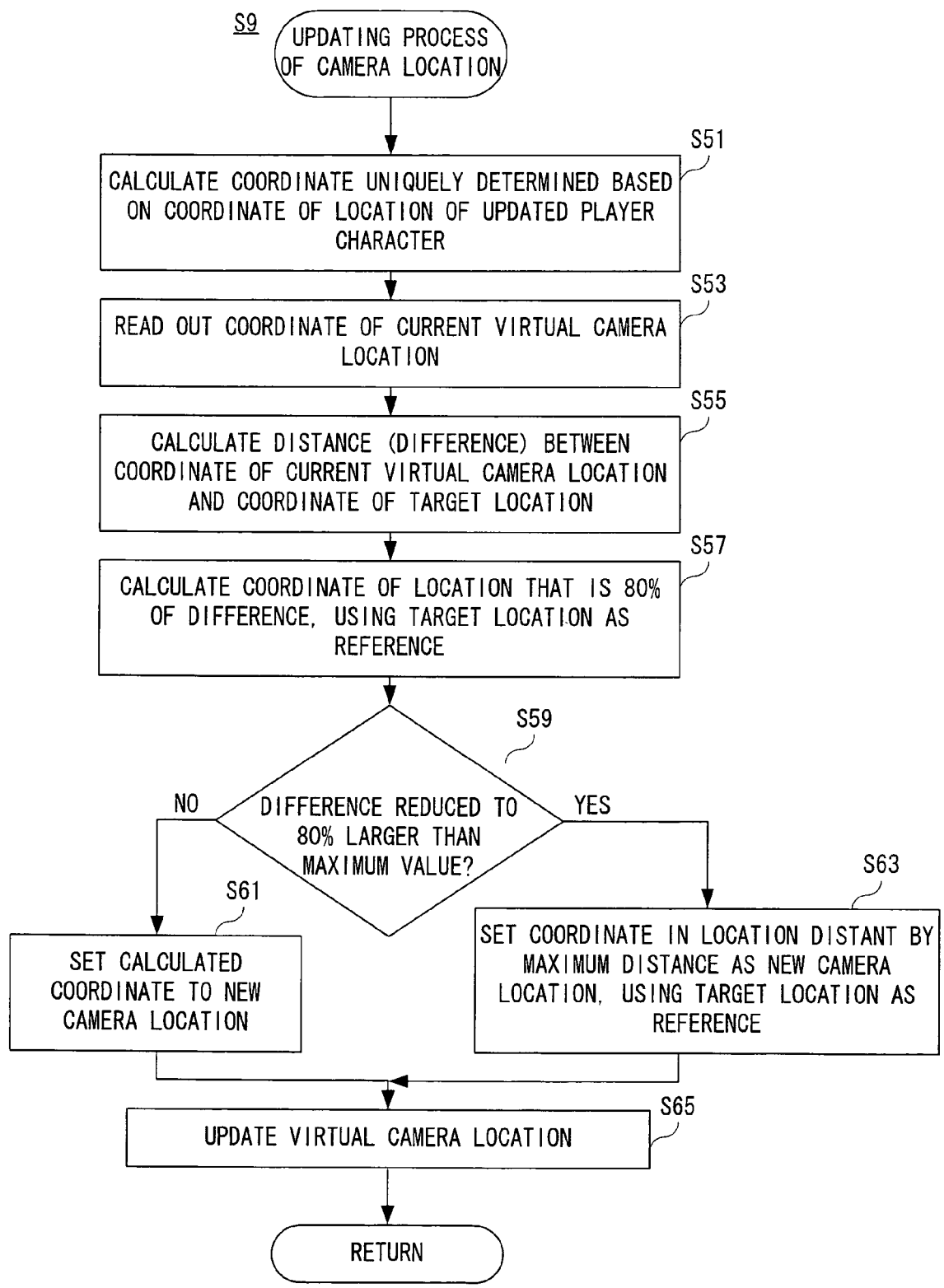
FIG. 12 is a flowchart showing one example of the updating operation of the camera location of the CPU in another embodiment.

FIG. 12 is a flowchart showing the updating process of the camera location in another embodiment. Referring to this FIG. 12, the CPU 36 starts the updating process of the camera location, and in a step S51, calculates the coordinate of the target location uniquely determined based on the updated location of the player character 82, that is, the coordinate of the character location. That is, the three-dimensional coordinate of the linked reference location by maintaining the predetermined distance relationship with the character location is calculated.

In a succeeding step S53, the location of the current virtual camera 84, that is, the camera coordinate data 404*f*, is read out. That is, the three-dimensional coordinate of the camera location yet to be moved is read out. Next, in a step S55, the distance between the current camera location and the reference location (target location), that is, the difference, is calculated, and writes (overwrites) the difference data 404*d* into the data storing area 404 of the main memory 40. Subsequently, in a step S57, the target location is served as the reference, the coordinate of the location that is 80% of the difference, that is, the three-dimensional coordinate of the updated camera location is calculated.

Then, in a step S59, it is determined whether or not the difference that is rendered 80% is larger than the maximum value (maximum distance). If "NO" in the step S59, that is, unless the maximum distance is exceeded, in a step S61, the camera location calculated in the step S57 is set as a new camera location, and the process advances to a step S65. On the other hand, if "YES" in the step S59, that is, in a case of exceeding the maximum distance, in a step S63, the target location is served as the reference, the coordinate in the location distant by the maximum distance is set as the new camera location, and then, the process advances to the step S65. That is, in the steps S61 and S63, the camera coordinate data 404*f* regarding the coordinate of the camera location calculated in the step S57, or the coordinate of the camera location set in the step S61 are written (overwritten) in the data storing area 404 of the main memory 40.

In the step S65, the location of the virtual camera is updated, and the updating process of the camera location is returned. In this step S65, the virtual camera 84 is moved to the location indicated by the updated camera coordinate data 404*f*, and in addition, the direction of the virtual camera 84 is set in such a manner that the virtual camera 84 is faces the location indicated by the reference location data 404*b*.

According to another embodiment, the camera location is updated in such a manner that the difference between the updated target location is minimized at the predetermined ratio while maintaining the predetermined distance relationship with the player character and the camera location so that, similar to the above-described embodiment, it is possible to display the game screen that has a gentle expression, and is easy to play.

In addition, the camera location is updated in such a manner that the camera location is brought close to the target location at the predetermined ratio, that is, the same process is repeated irrespective of presence or absence of the movement of the player character 82, or the moving speed, so that, similar to the above-described embodiment, it is possible to make the bug less likely to occur to the updating process of the camera location or the game screen displaying process.

Although the present exemplary embodiments have been described and illustrated in detail, it is clearly understood that the same is by way of illustration and example only and is not to be taken by way of limitation, the spirit and scope of the present invention being limited only by the terms of the appended claims.

What is claimed is:

1. A game apparatus in which a virtual camera arranged in a three-dimensional game space is made to move to follow a target location determined by a location of a player character in the game space so that a behavior of the player character in the game space is displayed in a display as a game image, comprising:

a computer processor;

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information at said intervals of said predetermined number of frames;

difference length calculating programmed logic circuitry for calculating at said intervals of said predetermined number of frames a difference length between a predetermined reference distance and a distance between said location of said target location and a location of said virtual camera;

virtual-camera-location updating programmed logic circuitry for updating at said intervals of said predetermined number of frames in order said location of said virtual camera in such a manner that said difference length calculated by said difference length calculating programmed logic circuitry is reduced by a predetermined ratio less than 1 of the difference length calculated at the previous interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value; and game-image generating programmed logic circuitry for generating the game image based on the updated location of said player character and location of said virtual camera.

2. The game apparatus according to claim 1, further comprising virtual-camera setting programmed logic circuitry for arranging the virtual camera in a location determined in a predetermined manner toward a point of regard, and setting a direction of said virtual camera in such a manner as to face said point of regard; wherein a reference location is a location of said point of regard, said virtual-camera-location updating programmed logic circuitry updates in order the location of said virtual camera by updating in order the location of said point of regard in such a manner that a distance from said target location to the location of said point of regard is shortened at the predetermined ratio.

3. The game apparatus according to claim 1, further comprising virtual-camera setting programmed logic circuitry for arranging the virtual camera in a location determined in a predetermined manner toward a point of regard, and setting a direction of said virtual camera in such a manner as to face said point of regard;

wherein a reference location is a location of said virtual camera, said target location is an initial location of said virtual camera that moves in conjunction with said player character, said virtual-camera-location updating programmed logic circuitry updates in order the location of said virtual camera in such a manner that a distance from said target location to the location of said virtual camera is shortened at the predetermined ratio.

4. The game apparatus according to claim 1, further comprising distance determining programmed logic circuitry for setting a maximum distance that uses said target location as a reference, and determining whether or not the distance between the target location and said virtual camera location is rendered longer than said maximum distance; and forcedly updating programmed logic circuitry for forcedly updating said virtual camera location to a location within the maximum distance that uses said target location as a reference when determined by said distance determining programmed logic circuitry that the distance is rendered longer than said maximum distance.

5. The game apparatus according to claim 4, wherein said camera-location updating programmed logic circuitry includes a virtual camera location calculating programmed logic circuitry for calculating an updated virtual camera location, and said distance determining programmed logic circuitry determines whether or not said updated virtual camera location calculated by said virtual camera-location calculating programmed logic circuitry is rendered longer than the maximum distance from said target location.

6. A non-transitory storing medium that stores a control program of a virtual camera executed by a computer of a game apparatus in which the virtual camera arranged in a three-dimensional game space is made to move to follow a target location determined by a location of a player character in the game space so that a behavior of the player character in the game space is displayed in a display as a game image, the control program of said virtual camera allows said computer to be functioned to provide:

an input-information obtaining programmed logic circuitry for obtaining input information input through a controller by a player at intervals of a predetermined number of frames in order to move said player character in said game space at a speed;

a location updating programmed logic circuitry for updating the location of said player character and said target location in said game space based on said input information at said intervals of said predetermined number of frames;

a difference length calculating programmed logic circuitry for calculating at said intervals of said predetermined number of frames a difference length between a predetermined reference distance and a distance between said location of said target location and a location of said virtual camera;

a virtual-camera-location updating programmed logic circuitry for updating at said intervals of said predetermined number of frames in order said location of said virtual camera in such a manner that said difference length calculated by said difference length calculating programmed logic circuitry is reduced by a predetermined ratio less than 1 of the difference length calculated at the previous interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value; and a game-image generating programmed logic circuitry for generating the game image based on a updated location of said player character and location of said virtual camera.

7. A method of controlling a virtual camera in a game apparatus in which the virtual camera arranged in a three-dimensional game space is made to move to follow a target location determined by a location of a player character in the game space so that a behavior of the player character in the game space is displayed in a display as a game image, comprising:

(a) obtaining input information input through a controller by a player at intervals of a predetermined number of frames in order to move said player character in said game space at a speed, (b) updating by a computer processor the location of said player character and said target location in said game space based on said input information at said intervals of said predetermined number of frames, (c) calculating by the computer processor at said intervals of said predetermined number of frames a difference length between a predetermined reference distance and a distance between said location of said target location and a location of said virtual camera, (d) updating at said intervals of said predetermined number of frames in order said location of said virtual camera in such a manner that said calculated difference length is reduced by a predetermined ratio less than 1 of the difference length calculated at the pervious interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value, and (e) generating the game image based on the updated location of said player character and location of said virtual camera.

8. A game apparatus in which a virtual camera arranged in a three-dimensional game space is made to move to follow a target location determined by a location of a player character in the game space so that a behavior of the player character in the game space may be displayed as a game image, comprising:

a computer processor;

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information at said intervals of said predetermined number of frames;

difference length calculating programmed logic circuitry for calculating at said intervals of said predetermined number of frames a difference length between a predetermined reference distance and a distance between said location of said target location and a location of said virtual camera;

virtual-camera-location updating programmed logic circuitry for sequentially updating at said intervals of said predetermined number of frames, on a frame by frame basis, said location of said virtual camera in such a manner that said difference length calculated by said difference length calculating programmed logic circuitry is reduced by a predetermined ratio less than 1 of the difference length calculated at the previous interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value; and game-image generating programmed logic circuitry for generating the game image based on the updated location of said player character and location of said virtual camera.

9. The game apparatus according to claim 8, further comprising virtual-camera setting programmed logic circuitry for arranging the virtual camera in a location determined in a predetermined manner toward a point of regard, and setting a direction of said virtual camera in such a manner as to face said point of regard; wherein a reference location is a location of said point of regard, said virtual-camera-location updating programmed logic circuitry sequentially updates, on a frame by frame basis, the location of said virtual camera by sequentially updating the location of said point of regard in such a manner that a distance between said target location and the location of said point of regard is made smaller at the predetermined ratio per frame.

10. The game apparatus according to claim 8, further comprising virtual-camera setting programmed logic circuitry for arranging the virtual camera in a location determined in a predetermined manner toward a point of regard, and setting a direction of said virtual camera in such a manner as to face said point of regard; wherein a reference location is a location of said virtual camera, said target location is an initial location of said virtual camera that moves in conjunction with said player character, said virtual-camera-location updating programmed logic circuitry sequentially updates, on a frame by frame basis, the location of said virtual camera in such a manner that a distance between said target location and the location of said virtual camera is shortened at the predetermined ratio.

11. The game apparatus according to claim 8, further comprising distance determining programmed logic circuitry for setting a maximum distance that uses said target location as a reference, and determining whether or not the distance between the target location and said virtual camera location is rendered longer than said maximum distance; and forcedly updating programmed logic circuitry for forcedly updating said virtual camera location to a location within the maximum distance that uses said target location as a reference when determined by said distance determining programmed logic circuitry that the distance is rendered longer than said maximum distance.

12. The game apparatus according to claim 11, wherein said camera-location updating programmed logic circuitry includes a virtual camera-location calculating programmed logic circuitry for calculating an updated virtual camera location, and said distance determining programmed logic circuitry determines whether or not said updated virtual camera location calculated by said virtual camera-location calculating programmed logic circuitry is rendered longer than the maximum distance from said target location.

13. A non-transitory storage medium that stores a control program of a virtual camera executed by a computer in which the virtual camera arranged in a three-dimensional game space follows a target location determined by a location of a player character in the game space so that a behavior of the player character in the game space may be displayed as a game image, the control program of said virtual camera allows execution by said computer to provide:

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information at said intervals of a predetermined number of frames;

difference length calculating programmed logic circuitry for calculating at said intervals of said predetermined number of frames a difference length between a predetermined reference distance and a distance between said location of said target location and a location of said virtual camera;

virtual-camera-location updating programmed logic circuitry for sequentially updating at said intervals of a predetermined number of frames, on a frame by frame basis, said location of said virtual camera in such a manner that said difference length calculated by said difference length calculating programmed logic circuitry is reduced by a predetermined ratio less than 1 of the difference length calculated at the previous interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value; and game-image generating programmed logic circuitry for generating the game image based on the updated location of said player character and location of said virtual camera.

14. A method of controlling a virtual camera in a three-dimensional game space so as to follow a target location determined by a location of a player character in the game space so that a behavior of the player character in the game space may be displayed in a display as a game image, the method comprising:

(a) obtaining input information input through a controller by a player at intervals of a predetermined number of frames in order to move said player character in said game space at a speed, (b) updating by a computer processor the location of said player character and said target location in said game space based on said input information at said intervals of a predetermined number of frames, (c) calculating by the computer processor at said intervals of said predetermined number of frames a difference length between a predetermined reference distance and a distance between said location of said target location and a location of said virtual camera, (d) sequentially updating at intervals of a predetermined number of frames, on a frame by frame basis, said location of said virtual camera in such a manner that said calculated difference length is reduced by a predetermined ratio less than 1 of the difference length calculated at the pervious interval when said difference length exists if the difference length is less or equal than a predetermined maximum value, regardless of whether the speed of the player character in the game space increases or decreases, wherein said difference length is set at the predetermined maximum value when said difference length calculated at the previous interval exceeds the predetermined maximum value, and (e) generating the game image based on the updated location of said player character and location of said virtual camera.

15. A game apparatus in which a virtual camera arranged in a three-dimensional game space is made to follow a target location determined by a location of a player character in the game space so that a behavior of the player character in the game space is displayed in a display as a game image, comprising:

a computer processor;

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information;

virtual-camera-location updating programmed logic circuitry for updating in order a location of said virtual camera in such a manner that a distance from said target location to a reference location determined in a predetermined manner toward the location of said virtual camera at a predetermined ratio less than 1 of the distance calculated at the previous interval is shortened, if the distance is less or equal than a predetermined maximum value, regardless of whether the speed of the player character in the game space increases or decreases, wherein said distance is set at the predetermined maximum value when said distance calculated at the previous interval exceeds the predetermined maximum value; and game-image generating programmed logic circuitry for generating the game image based on the updated location of said player character and location of said virtual camera; wherein a moving speed of the virtual camera is variable and is determined based on said determined distance.

16. The game apparatus according to claim 15, wherein the moving speed of the virtual camera varies based on said determined distance so that the moving speed is faster when said determined distance is farther and slower when said determined distance is closer.

17. A non-transitory storing medium that stores a control program of a virtual camera executed by a computer of a game apparatus in which the virtual camera arranged in a three-dimensional game space is made to follow a target location determined by a location of a player character in the game space so that a behavior of the player character in the game space is displayed in a display as a game image, the control program of said virtual camera allows said computer to be functioned to provide:

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information;

virtual-camera-location updating programmed logic circuitry for updating in order a location of said virtual camera in such a manner that a distance from said target location to a reference location determined in a predetermined manner toward the location of said virtual camera at a predetermined ratio less than 1 of the distance calculated at the previous interval is shortened, if the distance is less or equal than a predetermined maximum value, regardless of whether the speed of the player character in the game space increases or decreases, wherein said distance is set at the predetermined maximum value when said distance calculated at the previous interval exceeds the predetermined maximum value; and game-image generating programmed logic circuitry for generating the game image based on the updated location of said player character and location of said virtual camera; wherein a moving speed of the virtual camera is variable and is determined based on said determined distance.

18. The storing medium according to claim 17, wherein the moving speed of the virtual camera varies based on said determined distance so that the moving speed is faster when said determined distance is farther and slower when said determined distance is closer.

19. A method of controlling a virtual camera in a game apparatus in which the virtual camera arranged in a three-dimensional game space is made to follow a target location determined by a location of a player character in the game space so that a behavior of the player character in the game space is displayed in a display as a game image, comprising:

(a) obtaining input information input through a controller by a player at intervals of a predetermined number of frames in order to move said player character in said game space at a speed, (b) updating by a computer processor the location of said player character and said target location in said game space based on said input information, (c) updating by the computer processor in order a location of said virtual camera in such a manner that a distance from said target location to a reference location determined in a predetermined manner toward the location of said virtual camera at a predetermined ratio less than 1 of the distance calculated at the previous interval is shortened, if the distance is less or equal than a predetermined maximum value regardless of whether the speed of the player character in the game space increases or decreases, wherein said distance is set at the predetermined maximum value when said distance calculated at the previous interval exceeds the predetermined maximum value, and (d) generating the game image based on the updated location of said player character and location of said virtual camera;

wherein a moving speed of the virtual camera is variable and is determined based on said determined distance.

20. The method according to claim 19, wherein the moving speed of the virtual camera varies based on said determined distance so that the moving speed is faster when said determined distance is farther and slower when said determined distance is closer.

21. A game apparatus in which a virtual camera arranged in a three-dimensional game space is made to follow a target location determined by a location of a player character in the game space so that a behavior of the player character in the game space may be displayed as a game image, comprising:

a computer processor;

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information;

virtual-camera-location updating programmed logic circuitry for sequentially updating, on a frame by frame basis, a location of said virtual camera in such a manner that a distance between said target location and a reference location that is determined with respect to the location of said virtual camera is made smaller at a predetermined ratio less than 1 of the distance calculated at the previous interval per frame, if the distance is less or equal than a predetermined maximum value, regardless of whether the speed of the player character in the game space increases or decreases, wherein said distance is set at the predetermined maximum value when said distance calculated at the previous interval exceeds the predetermined maximum value; and game-image generating programmed logic circuitry for generating the game image based on the updated location of said player character and location of said virtual camera; wherein a moving speed of the virtual camera is variable and is determined on based said determined distance.

22. The game apparatus according to claim 21, wherein the moving speed of the virtual camera varies based on said determined distance so that the moving speed is faster when said determined distance is farther and slower when said determined distance is closer.

23. A non-transitory storage medium that stores a control program of a virtual camera executed by a computer in which the virtual camera arranged in a three-dimensional game space follows a target location determined by a location of a player character in the game space so that a behavior of the player character in the game space may be displayed as a game image, the control program of said virtual camera allows execution by said computer to provide:

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information;

virtual-camera-location updating programmed logic circuitry for sequentially updating, on a frame by frame basis, a location of said virtual camera in such a manner that a distance from said target location to a reference location that is determined with respect to the location of said virtual camera is made smaller at a predetermined ratio of the distance calculated at the previous interval per frame, if the distance is less or equal than a predetermined maximum value, regardless of whether the speed of the player character in the game space increases or decreases, wherein said distance is set at the predetermined maximum value when said distance calculated at the previous interval exceeds the predetermined maximum value; and game-image generating programmed logic circuitry for generating the game image based on the updated location of said player character and location of said virtual camera; wherein a moving speed of the virtual camera is variable and is determined based said determined distance.

24. The storage medium according to claim 23, wherein the moving speed of the virtual camera varies based on said determined distance so that the moving speed is faster when said determined distance is farther and slower when said determined distance is closer.

25. A method of controlling a virtual camera in a three-dimensional game space so as to follow a target location determined by a location of a player character in the game space so that a behavior of the player character in the game space may be displayed in a display as a game image, the method comprising:

(a) obtaining input information input through a controller by a player at intervals of a predetermined number of frames in order to move said player character in said game space at a speed, (b) updating by a computer processor the location of said player character and said target location in said game space based on said input information, (c) sequentially updating by the computer processor, on a frame by frame basis, a location of said virtual camera in such a manner that a distance from said target location to a reference location that is determined with respect to the location of said virtual camera is made smaller at a predetermined ratio less than 1 of the distance calculated at the previous interval per frame, if the distance is less or equal than a predetermined maximum value, regardless of whether the speed of the player character in the game space increases or decreases, wherein said distance is set at the predetermined maximum value when said distance calculated at the previous interval exceeds the predetermined maximum value, and (d) generating the game image based on the updated location of said player character and location of said virtual camera; wherein a moving speed of the virtual camera is variable and is determined based said determined distance.

26. The method according to claim 25, wherein the moving speed of the virtual camera varies based on said determined distance so that the moving speed is faster when said determined distance is farther and slower when said determined distance is closer.

27. A game apparatus in which a virtual camera arranged in a three-dimensional game space is made to move to follow a target location determined by a location of a player character in the game space so that a behavior of the player character in the game space is displayed in a display as a game image, comprising:

a computer processor;

input-information obtaining programmed logic circuitry for obtaining input information input through a controller by a player at intervals of a predetermined number of frames in order to move said player character in said game space at a speed;

location updating programmed logic circuitry for updating the location of said player character and said target location in said game space based on said input information at said intervals of said predetermined number of frames;

difference length calculating programmed logic circuitry for calculating at said intervals of said predetermined number of frames a difference length between a predetermined reference distance and a distance between said location of said target location and a location of said virtual camera;

virtual-camera-location updating programmed logic circuitry for updating at said intervals of said predetermined number of frames in order said location of said virtual camera in such a manner that said difference length calculated by said difference length calculating programmed logic circuitry is reduced by a predetermined ratio less than 1 of the difference length calculated at the previous interval when said difference length exists if the difference length is less or equal than a predetermined maximum value, when the speed of the player character increases, wherein said difference length is set at the predetermined maximum value when said difference length calculated at the previous interval exceeds the predetermined maximum value; and game-image generating programmed logic circuitry for generating the game image based on the updated location of said player character and location of said virtual camera.

* * * * *